US010351684B2

(12) United States Patent
Nagai et al.

(10) Patent No.: US 10,351,684 B2
(45) Date of Patent: Jul. 16, 2019

(54) ION EXCHANGE MEMBRANE, POLYMER ELEMENT, ELECTRONIC APPARATUS, CAMERA MODULE, AND IMAGING DEVICE

(71) Applicant: DEXERIALS CORPORATION, Tokyo (JP)

(72) Inventors: Nobuyuki Nagai, Tokyo (JP); Takehisa Ishida, Tokyo (JP); Yusaku Kato, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 297 days.

(21) Appl. No.: 15/034,589

(22) PCT Filed: Nov. 19, 2014

(86) PCT No.: PCT/JP2014/080599
§ 371 (c)(1),
(2) Date: May 5, 2016

(87) PCT Pub. No.: WO2015/083544
PCT Pub. Date: Jun. 11, 2015

(65) Prior Publication Data
US 2016/0280870 A1    Sep. 29, 2016

(30) Foreign Application Priority Data
Dec. 2, 2013  (JP) ................................ 2013-249011

(51) Int. Cl.
*C08J 5/22* (2006.01)
*G02B 7/10* (2006.01)
*H04N 5/225* (2006.01)
*G03B 3/10* (2006.01)
*G03B 5/00* (2006.01)

(52) U.S. Cl.
CPC ............ *C08J 5/2275* (2013.01); *G02B 7/102* (2013.01); *H04N 5/2253* (2013.01); *H04N 5/2254* (2013.01); *H04N 5/2257* (2013.01); *C08J 2327/18* (2013.01); *C08J 2329/10* (2013.01); *C08J 2425/06* (2013.01); *C08J 2441/00* (2013.01); *C08J 2465/02* (2013.01); *C08J 2479/08* (2013.01); *C08J 2481/06* (2013.01); *G03B 3/10* (2013.01); *G03B 5/00* (2013.01); *G03B 2205/0084* (2013.01)

(58) Field of Classification Search
CPC .. H01M 8/10; H01M 10/40; C08J 5/22; C08J 5/2275; C08J 2465/02; C08J 2425/06; C08J 2327/18; C08J 2329/10
USPC ........................................................ 521/25
See application file for complete search history.

(56) References Cited

U.S. PATENT DOCUMENTS

| | | | | |
|---|---|---|---|---|
| 5,661,220 A | * | 8/1997 | Faul ..................... | B01D 17/047 516/184 |
| 2007/0166591 A1 | * | 7/2007 | Machida ................ | C08J 5/2256 429/492 |
| 2012/0276462 A1 | * | 11/2012 | Ishida ..................... | G02B 7/08 429/413 |

FOREIGN PATENT DOCUMENTS

| | | |
|---|---|---|
| JP | 2003-327825 A | 11/2003 |
| JP | 2004-047244 A | 2/2004 |
| JP | 2004-107461 A | 4/2004 |
| JP | 2007-112906 A | 5/2007 |
| JP | 2007-112907 A | 5/2007 |
| JP | 2007-217675 A | 8/2007 |
| JP | 2008-259381 A | 10/2008 |
| JP | 2012-235585 A | 11/2012 |
| WO | 2012/081026 A2 | 6/2012 |
| WO | WO-2012/081026 A2 * | 6/2012 |

OTHER PUBLICATIONS

Jan. 20, 2015 International Search Report issued in International Patent Application No. PCT/JP2014/080599.
Jan. 20, 2015 Written Opinion of the International Search Authority issued in International Patent Application No. PCT/JP2014/080599.
Jan. 12, 2016 Written Opinion of the International Preliminary Examining Authority issued in International Patent Application No. PCT/JP2014/080599.
Jun. 6, 2016 International Preliminary Report on Patentability issued in Patent Application No. PCT/JP2014/080599.
Jun. 5, 2018 Office Action issued in Chinese Patent Application No. 201480065552.9.
Nov. 20, 2018 Office Action Issued in Japanese Patent Application No. 2015-551453.
Mar. 6, 2019 Office Action Issued in Chinese Patent Application No. 201480065552.9.

* cited by examiner

*Primary Examiner* — Peter D. Mulcahy
(74) *Attorney, Agent, or Firm* — Oliff PLC

(57) ABSTRACT

An ion exchange membrane includes: a cation exchange resin material; and a macromolecular material that has an acidic functional group and is mixed in the cation exchange resin material.

15 Claims, 11 Drawing Sheets

ION EXCHANGE MEMBRANE, POLYMER ELEMENT, ELECTRONIC APPARATUS, CAMERA MODULE, AND IMAGING DEVICE

TECHNICAL FIELD

The present technology relates to an ion exchange membrane suitable for a polymer element such as a polymer actuator element and a polymer sensor element, and a polymer element, an electronic apparatus, a camera module, and an imaging device, each using the ion exchange membrane.

BACKGROUND ART

In recent years, the performance of portable electronic apparatuses such as a mobile phone, a personal computer (PC), and a personal digital assistant (PDA) has been remarkably enhanced, and a portable electronic apparatus provided with a camera module as an imaging function has been common. In such a portable electronic apparatus, a lens in the camera module is moved in an optical axis direction thereof to perform focusing and zooming.

Conventionally, the lens in the camera module is generally moved by a method using a voice coil motor, a stepping motor, or the like, as a drive unit. On the other hand, recently, an apparatus using a predetermined actuator element as a drive unit has been developed from the viewpoints of miniaturization. Examples of such an actuator element may include a polymer actuator element (see Patent Literature 1). For example, the polymer actuator element has an ion conductive macromolecular layer (hereinafter simply referred to as a macromolecular layer) disposed between a pair of electrodes. In the polymer actuator element, when an electric field is applied to the electrodes, ions move in the macromolecular layer to cause displacement. Therefore, the operation characteristics of the polymer actuator element such as a displacement amount and a generative force largely depend on a conductive environment of the ions. A polymer element is used as the polymer actuator element, as described above. In addition, the polymer element is also used for a polymer sensor element or an electric double layer capacitor.

For example, an ion exchange resin material is used for at least one of an electrode and a macromolecular layer in the polymer element. When the density of functional group in the ion exchange resin material is increased, that is, when the ion exchange capacity is increased, the ion conductivity of the polymer element is improved.

CITATION LIST

Patent Literature

Patent Literature 1: Japanese Patent Application Laid-Open No. 2012-235585

SUMMARY OF INVENTION

Technical Problem

However, when the density of functional group in the ion exchange resin is increased, the strength of a membrane to be formed from the ion exchange resin decreases. Therefore, the reliability of the polymer element produced using the ion exchange resin decreases.

It is desirable that an ion exchange membrane capable of maintaining the strength and increasing the density of functional group be provided. Further, it is desirable that a polymer element, an electronic apparatus, a camera module, and an imaging device that are capable of maintaining the reliability and improving the operation characteristics using the ion exchange membrane be provided.

An ion exchange membrane of an embodiment (A) of the present technology includes a cation exchange resin material and a macromolecular material that has an acidic functional group and is mixed in the cation exchange resin material.

An ion exchange membrane of an embodiment (B) of the present technology includes an anion exchange resin material and a macromolecular material that has a basic functional group and is mixed in the anion exchange resin material.

A polymer element of an embodiment of the present technology has a pair of electrode layers and a macromolecular layer disposed between the electrode layers, and at least one of the electrode layers and the macromolecular layer includes a cation exchange resin material and a macromolecular material that has an acidic functional group and is mixed in the cation exchange resin material.

An electronic apparatus of an embodiment of the present technology includes a polymer element having a pair of electrode layers and a macromolecular layer disposed between the electrode layers, wherein at least one of the electrode layers and the macromolecular layer includes a cation exchange resin material and a macromolecular material that has an acidic functional group and is mixed in the cation exchange resin material.

A camera module of an embodiment of the present technology includes a lens and a drive device that is configured to include a polymer element and drives the lens, wherein the polymer element has a pair of electrode layers and a macromolecular layer disposed between the electrode layers, and at least one of the electrode layers and the macromolecular layer includes a cation exchange resin material and a macromolecular material that has an acidic functional group and is mixed in the cation exchange resin material.

An imaging device of an embodiment of the present technology includes a lens, an imaging element that acquires an imaging signal resulting from imaging by the lens, and a drive device that is configured to include a polymer element and drives the lens or the imaging device, wherein the polymer element has a pair of electrode layers and a macromolecular layer disposed between the electrode layers, and at least one of the electrode layers and the macromolecular layer includes a cation exchange resin material and a macromolecular material that has an acidic functional group and is mixed in the cation exchange resin material.

In the ion exchange membrane of the embodiment (A) of the present technology, the macromolecular material having an acidic functional group is mixed in the cation exchange resin. In the ion exchange membrane of the embodiment (B) of the present technology, the macromolecular material having a basic functional group is mixed in the anion exchange resin. Therefore, the acidic functional group or the basic functional group that is derived from the macromolecular material exists in the ion exchange membrane in addition to an acidic functional group or a basic functional group that is contained in the cation exchange resin material itself or the anion exchange resin material itself, respectively. In the polymer element, the electronic apparatus, the camera module, or the imaging device of the embodiment of the present technology, the ion exchange membrane of the embodiment (A) of the present technology is used. Therefore, the acidic functional group derived from the macromolecular material similarly exists in the ion exchange membrane.

In the ion exchange membrane of the embodiment (A) or (B) of the present technology, the acidic functional group or the basic functional group that is derived from the macromolecular material exists. For this reason, the number of the acidic functional group or the basic functional group in the ion exchange membrane can be increased without an increase in density of functional group in the cation exchange resin itself or the anion exchange resin itself. Therefore, the strength can be maintained and the density of functional group can be increased. According to the polymer element, the electronic apparatus, the camera module, and the imaging device of the embodiment of the present technology, the ion exchange membrane of the embodiment (A) is used. Therefore, the reliability can be maintained and the operation characteristics can be improved. The effects described herein are not necessarily limited, and may be any effects described in this disclosure.

BRIEF DESCRIPTION OF DRAWINGS

FIG. 8 is a perspective view illustrating a configuration of an electronic apparatus using the polymer element of FIG. 1 or the like.

FIG. 15A is a schematic view illustrating an example of a configuration of the electronic apparatus using the polymer element of FIG. 1 or the like.

DESCRIPTION OF EMBODIMENTS

Hereinafter, an embodiment of the present technology will be described in detail with reference to the drawings. The description will be given in the following order.
1. Embodiments (polymer element: an example in which an electrode layer is constituted by an ion exchange membrane in which a macromolecular material is mixed)
2. Modification 1 (an example in which a macromolecular layer is constituted by an ion exchange membrane in which a macromolecular material is mixed)
3. Modification 2 (an example in which electrode layers and a macromolecular layer are each constituted by an ion exchange membrane in which a macromolecular material is mixed)
4. Examples
5. Application Examples
   Application Example 1 (an example of application to an imaging device including a drive device for driving a lens)
   Application Example 2 (an example of application to an imaging device including a drive device for driving an imaging device)

Other Application Examples

Embodiments

[Configuration of Polymer Element 1]

Figure 1:
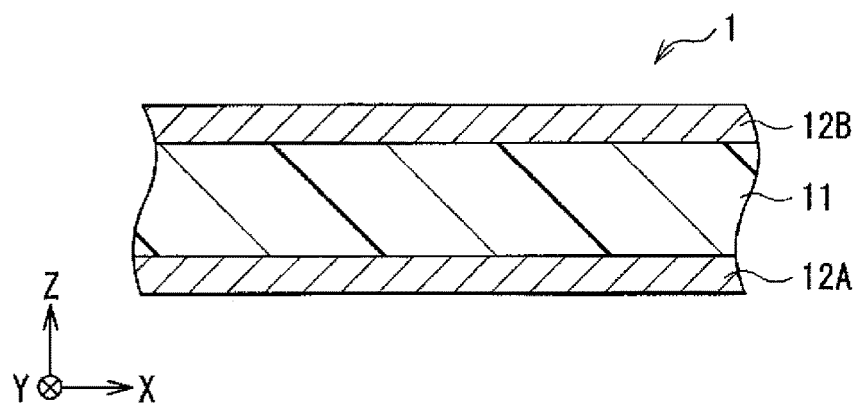
FIG. 1 is a cross-sectional view illustrating a configuration of a polymer element according to an embodiment of the present technology.

FIG. 1 shows a cross-sectional configuration example (a Z-X cross-sectional configuration example) of a polymer element (a polymer element 1) according to an embodiment of the present technology. The polymer element 1 has a macromolecular layer 11 disposed between a pair of electrode layers 12A and 12B, and for example, is applied to a polymer actuator element, a polymer sensor element, or the like. A surrounding of the polymer element 1 may be covered with an insulating protective film. The insulating protective film can be constituted, for example, by a highly elastic material (for example, polyurethane).

(Macromolecular Layer 11)

The macromolecular layer 11 is constituted, for example, by an ion conductive macromolecular compound membrane that is impregnated with an ionic substance. The term "ionic substance" used herein refers to a general ion capable of passing through the macromolecular layer 11. Specifically, the ionic substance means a hydrogen ion alone, a metal ion alone, a substance containing the cation and/or anion and a polar solvent, or a substance containing a cation and/or an anion such as an imidazolium salt that is liquid. Examples of the former substance may include a substance in which a polar solvent is solvated with a cation and/or an anion. Examples of the latter substance may include an ionic liquid.

The ionic substance may be an organic substance or an inorganic substance regardless of the kind thereof. The ionic substance may contain a cation or an anion. Herein, a case of an ionic substance containing a cation will be described. Examples of the ionic substance containing a cation may include various forms such as a metal ion alone, substances containing a metal ion and water, substances containing an organic cation and water, and an ionic liquid. Specific examples of the metal ions may include light metal ions such as a sodium ion ($Na^+$), a potassium ion ($K^+$), a lithium ion ($Li^-$), and a magnesium ion ($Mg^{2+}$). Examples of the organic cations may include alkyl ammonium ions. Ions contained in the ionic substance exist as hydrates in the macromolecular layer 11. Therefore, it is preferable that the whole polymer element 1 be sealed to prevent evaporation of moisture in the polymer element 1.

The ionic liquid contains a cation and an anion. The ionic liquid is a so-called normal-temperature molten salt, and is flame retardant and low-volatile. Specific examples of the ionic liquid may include an imidazolium-based compound, a pyridinium ring-based compound, and an aliphatic compound. As the ionic substance, the ionic liquid is preferably used. When a macromolecular layer 11 containing a low-volatile ionic liquid is used, the polymer element 1 operates excellently even in a high-temperature atmosphere or in vacuum.

As an ion conductive macromolecular compound membrane to be impregnated with a cationic substance as the ionic substance, for example, a cation exchange resin membrane using a fluorine resin, a hydrocarbon-based resin, or the like, as a skeleton can be used. Examples of the cation exchange resin membrane may include cation exchange resin membranes into which an acidic functional group such as a sulfone (sulfo) group and a carboxyl group is introduced. Specific examples thereof may include membranes of a polyethylene having an acidic functional group, a polystyrene having an acidic functional group, and a fluorine resin having an acidic functional group. In particular, it is preferable that the cation exchange resin membrane be a membrane of a fluorine resin having a sulfone group or a carboxyl group, for example, Nafion (available from DuPont) represented by Chemical Formula 1.

[Chemical Formula 1]

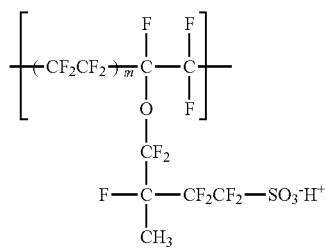

(In Chemical Formula 1, m represents an integer of 5 to 7.)
(Electrode Layers 12A and 12B)

Each of the electrode layers 12A and 12B is constituted by an ion exchange membrane containing one or more kinds of conductive materials. When the ion conductive macromolecular compound membrane constituting the macromolecular layer 11 is a cation exchange resin membrane, the ion exchange membrane in the electrode layers 12A and 12B is a cation exchange membrane. In this embodiment, the cation exchange membrane contains a cation exchange resin material and a macromolecular material having an acidic functional group, which are mixed together. The cation exchange membrane may be constituted by mixing two or more kinds of cation exchange resins having largely different densities of functional groups. This enables to maintain the strength of the ion exchange membrane and enhance the density of functional group in the ion exchange membrane, which will be described below in detail. For example, the macromolecular material has a molecular weight of 10,000 or more.

As the cation exchange resin material, the same material as the material for the above-described cation exchange resin membrane constituting the macromolecular layer 11 can be used. For example, a material in which a fluorine resin or a hydrocarbon-based resin is a skeleton and an acidic functional group such as a sulfone group and a carboxyl group is introduced can be used. Specifically, a membrane of a polyethylene having an acidic functional group, a polystyrene having an acidic functional group, or a fluorine resin having an acidic functional group can be used. For example, when the macromolecular layer 11 contains Nafion (available from DuPont), Nafion is used as the cation exchange resin material in the electrode layers 12A and 12B. The ion exchange capacity (IEC) of the cation exchange resin material in the electrode layers 12A and 12B is, for example, about 0.9 meq/g to about 1.5 meq/g, and preferably about 0.9 meq/g to about 1.0 meq/g. The ion exchange capacity herein refers to the number of all ion exchange groups involved in ion exchange per unit resin amount in a wet state.

Examples of macromolecular materials to be mixed in the cation exchange resin material may include polystyrene sulfonate (PSS) represented by Chemical Formula 2. The PSS has a sulfone group as an acidic functional group.

[Chemical Formula 2]

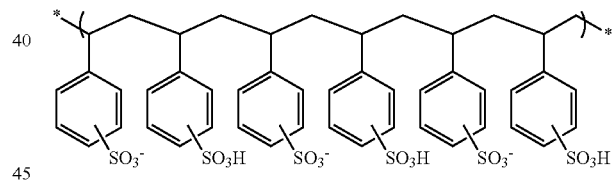

As the macromolecular material, a derivative of polystyrenesulfonic acid may be used. For example, fluorinated polystyrenesulfonic acid may be used.

As a macromolecular material having a sulfone group, polyvinylsulfonic acid represented by Chemical Formula 3, polyethersulfonic acid represented by Chemical Formula 4, a polyethersulfonic acid derivative represented by Chemical Formula 5, or the like may be used.

[Chemical Formula 3]

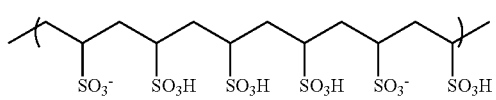

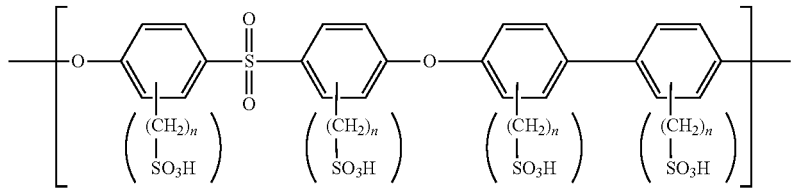

[Chemical Formula 4]

(In Chemical Formula 4, n is an integer of 1 to 6, and preferably 1.)

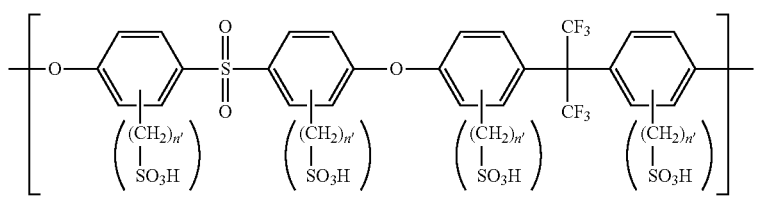

[Chemical Formula 5]

(In Chemical Formula 5, n' is an integer of 1 to 6, and preferably 1.)

In addition, as the macromolecular material having a sulfone group, a macromolecular material such as a polyimide-based macromolecular sulfonic acid and a macromolecular sulfonic acid having a poly(p-phenylene) structure may be used.

The acidic functional group may be, for example, a carboxyl group. Examples of a macromolecular material having a carboxyl group may include a polyacrylic acid represented by Chemical Formula 6. When the acidic functional group in the cation exchange resin material is a sulfone group, the acidic functional group in the macromolecular material is preferably also a sulfone group. When the acidic functional group in the cation exchange resin material is a carboxyl group, the acidic functional group in the macromolecular material is preferably also a carboxyl group.

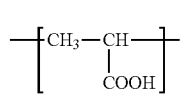

[Chemical Formula 6]

It is preferable that the density of the acidic functional group in such a macromolecular material be higher than the density of the acidic functional group in the cation exchange resin material. It is preferable that IEC of such a macromolecular material be higher than IEC of the cation exchange resin material. For example, IEC of the macromolecular material (the number of acidic functional group per unit amount of the macromolecular material) is 2 meq/g or more. The equivalent weight EW of PSS is, for example, about 184 g/eq, and IEC thereof is about 5.43 meq/g. The relationship between EW and IEC represents IEC (meq/g)=1,000/EW (g/eq). For example, EW of fluorinated polystyrenesulfonic acid is about 238 g/eq, and IEC thereof is about 4.20 meq/g. For example, EW of the polyimide-based macromolecular sulfonic acid is about 288 g/eq, and IEC thereof is about 3.47 meq/g. For example, EW of the polyether-based macromolecular sulfonic acid is about 277 g/eq, and IEC thereof is about 3.61 meq/g. For example, EW of the macromolecular sulfonic acid having a poly(p-phenylene) structure is about 260 g/eq, and IEC thereof is about 3.85 meq/g. In the cation exchange resin material and the macromolecular material (when the total weight of the mixture of the cation exchange resin material and the macromolecular material is 100%), the weight ratio of the macromolecular material is, for example, 5% to 25%. When the weight ratio of the macromolecular material is less than 5%, the number of the acidic functional group is unlikely to be sufficiently increased. When the weight ratio of the macromolecular material is more than 25%, the properties of the cation exchange membrane may be adversely affected. It is preferable that the ion exchange membrane containing the cation exchange resin material and the macromolecular material having an acidic functional group be elastic, and the Young's modulus thereof is, for example, 0.3 GPa or more.

It is preferable that as the conductive material contained in the electrode layers 12A and 12B, a conductive material powder be used. When the conductive material powder is bonded together through the ion exchange resin material and the macromolecular material, the flexibility of the electrode layers 12A and 12B can be improved. Examples of the conductive material powder may include carbon powder such as ketjen black. Since the carbon powder has high conductivity and large specific surface area, the deformation amount is increased. As the conductive material powder, metal powder may be used.

The electrode layers 12A and 12B may have a multilayer structure. In this case, it is preferable that the electrode layers have a structure in which an ion exchange membrane containing a conductive material and a metal layer are layered in order from side closer to the macromolecular layer 11. This is because a potential in an in-plane direction of the electrode layers 12A and 12B is closer to a uniform value and superior deformation performance is obtained. Examples of a material constituting the metal layer may include noble metal such as gold and platinum. Although the metal layer may have any thickness, it is preferable that the metal layer be a continuous membrane so that a potential is uniform in the electrode layers 12A and 12B. Examples of a method of forming the metal layer may include a plating method, a vapor deposition method, and a sputtering method. The electrode layers 12A and 12B may be formed by forming the metal layer on a base material in advance and transferring the metal layer from the base material to the ion exchange membrane.

[Method for Producing Polymer Element 1]

The polymer element 1 of the embodiment may be produced as follows, for example.

Constituent materials for the electrode layers 12A and 12B are mixed to prepare a coating. Specifically, the conductive material powder, the cation exchange resin material, and the macromolecular material having an acidic functional group are dispersed in a dispersion medium. Next, the coating is applied to both faces of the macromolecular layer 11, and dried. Thus, the polymer element 1 is completed. Alternatively, the polymer element 1 may be formed by mixing the constituent materials for the electrode layers 12A and 12B, forming a film, and pressure-bonding the film to both the faces of the macromolecular layer 11.

[Functions and Effects of Polymer Element 1]

(A. Basic Operation in Case of Functioning as Polymer Actuator Element)

In the polymer element 1 of the embodiment, when a predetermined potential difference is generated between the electrode layers 12A and 12B, deformation (curvature) occurs in the macromolecular layer 11 on the basis of the following principle. In this case, the polymer element 1 functions as a polymer actuator element. The operation of the polymer element 1 as the polymer actuator element will be described below.

Figure 2A:
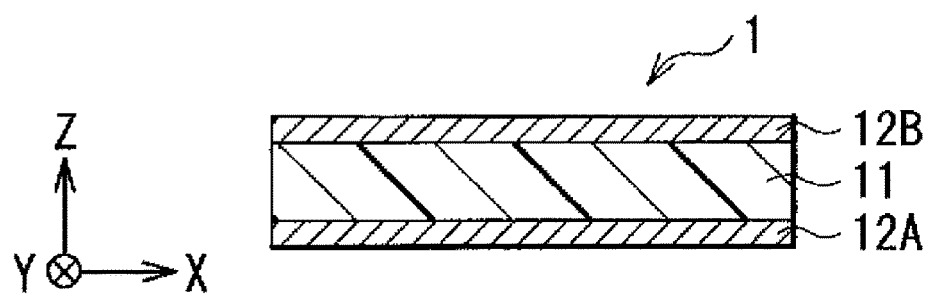
FIG. 2A is a cross-sectional view illustrating the polymer element of FIG. 1 during no application of voltage.
Figure 2B:
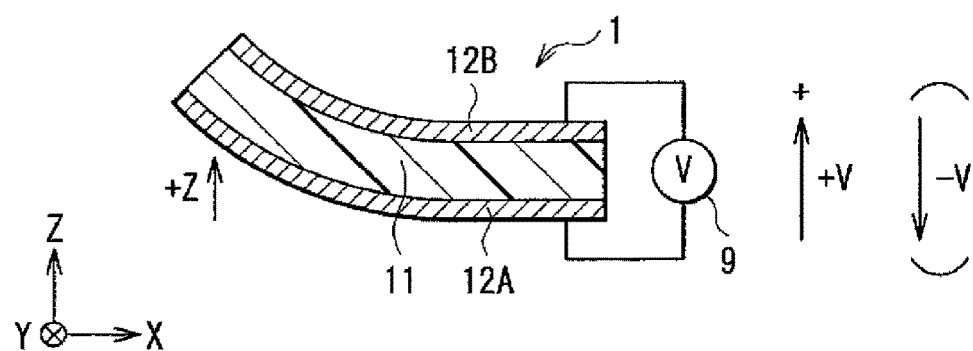
FIG. 2B is a schematic cross-sectional view illustrating the operation of the polymer element of FIG. 1 during application of voltage.

FIGS. 2A and 2B schematically show the operation of the polymer element 1 (as the polymer actuator element) using cross-sectional views (Z-X cross-sectional views). Hereinafter, the operation of the polymer element 1 will be described for cases according to the kind of ionic substance with which the macromolecular layer 11 is impregnated.

First, a case using a substance containing cations and a polar solvent as the ionic substance will be described.

In this case, the polymer element 1 in a state where no voltage is applied is not curved and is planar (FIG. 2A) since the cationic substance is dispersed in the macromolecular layer 11 substantially uniformly. When a voltage is applied (application of a drive voltage Vd is started) by a voltage function unit 9 (in this case, a voltage supply unit) shown in FIG. 2B, the polymer element 1 shows the following behavior. For example, when a predetermined drive voltage Vd is applied to the electrode layers 12A and 12B so that the electrode layer 12A has a negative potential and the electrode layer 12B has a positive potential (see an arrow "+V" in FIG. 2B), cations move toward the electrode layer 12A side in a state where the cations are solvated with the polar solvent. At this time, anions do not almost move in the macromolecular layer 11. Therefore, the side closer to the electrode layer 12A is swollen and the side closer to the electrode layer 12B is shrunk in the macromolecular layer 11. The polymer element 1 as a whole is curved toward the electrode layer 12B side as shown by an arrow "+Z" in FIG. 2B.

After that, when a potential difference between the electrode layers 12A and 12B is eliminated to make a state where no voltage is applied (by stopping the application of the drive voltage Vd), the cationic substance (the cations and the polar solvent) that has locally existed on the side closer to the electrode layer 12A is diffused in the macromolecular layer 11 and returns to the state shown in FIG. 2A.

When the predetermined drive voltage Vd is applied to the electrode layers 12A and 12B in the state where no voltage is applied as shown in FIG. 2A so that the electrode layer 12A has a positive electric potential and the electrode layer 12B has a negative electric potential, the cations move toward the electrode layer 12B side in a state where cations are solvated with the polar solvent. In this case, the side closer to the electrode layer 12A is shrunk and the side closer to the electrode layer 12B is swollen in the macromolecular layer 11. The polymer element 1 as a whole is curved toward the electrode layer 12A side (not shown).

Also in this case, when a potential difference between the electrode layers 12A and 12B is eliminated to make a state where no voltage is applied, the cationic substance that has locally existed on the side closer to the electrode layer 12B is diffused in the macromolecular layer 11, and returns to the state shown in FIG. 2A.

Next, a case using an ionic liquid containing liquid cations as the ionic substance will be described.

In this case, the polymer element 1 is planar as shown in FIG. 2A since the ionic liquid is dispersed in the macromolecular layer 11 substantially uniformly in a state where no voltage is applied. Herein, when a voltage is applied by a voltage function unit 9 (application of drive voltage Vd is started), the polymer element 1 shows the following behavior. For example, when the predetermined drive voltage Vd is applied to the electrode layers 12A and 12B so that the electrode layer 12A has a negative potential and the electrode layer 12B has a positive potential (see the arrow "+V" in FIG. 2B), cations in the ionic liquid move toward the electrode layer 12A side. On the other hand, anions in the ionic liquid cannot move in the macromolecular layer 11 that is a cation ion exchange membrane. Therefore, the side closer to the electrode layer 12A is swollen and the side closer to the electrode layer 12B is shrunk in the macromolecular layer 11. The polymer element 1 as a whole is curved toward the electrode layer 12B side as shown by the arrow "+Z" in FIG. 2B.

After that, when a potential difference between the electrode layers 12A and 12B is eliminated to make a state where no voltage is applied (by stopping the application of the drive voltage Vd), the cations that have locally existed on the side closer to the electrode layer 12A are diffused in the macromolecular layer 11 and return to the state shown in FIG. 2A.

When the predetermined drive voltage Vd is applied to the electrode layers 12A and 12B in the state where no voltage is applied as shown in FIG. 2A so that the electrode layer 12A has a positive electric potential and the electrode layer 12B has a negative electric potential, the cations in the ionic liquid move toward the electrode layer 12B side. In this case, the side closer to the electrode layer 12A is shrunk and the side closer to the electrode layer 12B side is swollen in the macromolecular layer 11. The polymer element 1 as a whole is curved toward the electrode layer 12A side (not shown).

Also in this case, when a potential difference between the electrode layers 12A and 12B is eliminated to make a state where no voltage is applied, the cations that have locally existed on the side closer to the electrode layer 12B are diffused in the macromolecular layer 11, and return to the state shown in FIG. 2A.

(B. Basic Operation in Case of Functioning as Polymer Sensor Element)

Conversely, when the macromolecular layer 11 is deformed (curved) in a direction orthogonal to the thickness direction (in this case, in a Z-axis direction) in the polymer element 1 of the embodiment, a voltage (electromotive force) is generated between the electrode layers 12A and 12B on the basis of the following principle. In this case, the polymer element 1 can function as a polymer sensor element (for example, a speed sensor and an acceleration sensor). Hereinafter, the operation of the polymer element 1 will be described for cases according to the kind of ionic substance with which the macromolecular layer 11 is impregnated.

First, a case using a substance containing cations and a polar solvent as the ionic substance will be described.

In this case, when the polymer element 1 itself is not in a linear motion or a rotation motion, and acceleration and angular acceleration are not generated, forces caused by the acceleration and the angular acceleration are not applied to the polymer element 1. Therefore, the polymer element 1 is not deformed (curved), and is planar (FIG. 2A). The cationic substance is dispersed in the macromolecular layer 11 substantially uniformly. Accordingly, a potential difference is not generated between the electrode layers 12A and 12B, and a voltage detected in the polymer element 1 is 0 V.

In contrast, for example, when the polymer element 1 itself makes a linear motion or a rotation motion to generate acceleration or angular acceleration, a force caused by the acceleration or the angular acceleration is applied to the polymer element 1. Therefore, the polymer element 1 is deformed (curved) (FIG. 2B).

For example, when the polymer element 1 is deformed in a positive direction on the Z-axis (on the electrode layer 12B side) as shown in FIG. 2B, the side closer to the electrode layer 12B is shrunk and the side closer to the electrode layer 12A is swollen in the macromolecular layer 11. As a result, cations move toward the electrode layer 12A side in a state where the cations are solvated with the polar solvent. Therefore, while the cations are dense on the side closer to the electrode layer 12A, the cations are sparse on the side closer to the electrode layer 12B. In this case, a voltage V having a higher potential on the electrode layer 12A side than that on the electrode layer 12B side is generated in the polymer element 1. As shown by an arrow "−V" in parentheses in FIG. 2B, a negative voltage (−V) is detected by the voltage function unit 9 (in this case, a voltmeter) connected to the electrode layers 12A and 12B.

In contrast, when the polymer element 1 is deformed in a negative direction on the Z-axis (on the electrode layer 12A side), the side closer to the electrode layer 12A is shrunk and the side closer to the electrode layer 12B is swollen in the macromolecular layer 11. As a result, cations move toward the electrode layer 12B side in a state where the cations are solvated with the polar solvent. Therefore, while the cations are dense on the electrode layer 12B side, the cations are sparse on the electrode layer 12A side. In this case, a voltage V having a higher potential on the electrode layer 12B side than that on the electrode layer 12A side is generated in the polymer element 1. Accordingly, a positive voltage (+V) is detected by the voltage function unit 9 (voltmeter) connected to the electrode layers 12A and 12B.

Next, a case using an ionic liquid containing liquid cations as the ionic substance will be described.

Also in this case, for example, when the polymer element 1 itself is not in a linear motion or a rotation motion, and acceleration and angular acceleration are not generated, the polymer element 1 is not deformed (curved), and is planar (FIG. 2A). Therefore, the ionic liquid is dispersed in the macromolecular layer 11 substantially uniformly. Accordingly, a potential difference is not generated between the electrode layers 12A and 12B, and a voltage detected in the polymer element 1 is 0 V.

In contrast, when the polymer element 1 itself makes a linear motion or a rotation motion to generate acceleration or angular acceleration, a force caused by the acceleration or the angular acceleration is applied to the polymer element 1. As a result, the polymer element 1 is deformed (curved) (FIG. 2B).

For example, when the polymer element 1 is deformed in the positive direction on the Z-axis (on the electrode layer 12B side) as shown in FIG. 2B, the side closer to the electrode layer 12B is shrunk and the side closer to the electrode layer 12A is swollen in the macromolecular layer 11. When the macromolecular layer 11 is a cation exchange membrane, cations in the ionic liquid move toward the electrode layer 12A side in the membrane. In contrast, anions are blocked by a functional group in the macromolecular layer 11 and are not allowed to move. In this case, a voltage V having a higher potential on the electrode layer 12A side than that on the electrode layer 12B side is generated in the polymer element 1. In this case, as shown by the arrow "−V" in parentheses in FIG. 2B, a negative voltage (−V) is detected by the voltage function unit 9 (in this case, voltmeter) connected to the electrode layers 12A and 12B.

When the polymer element 1 is deformed in the negative direction on the Z-axis (on the electrode layer 12A side), the side closer to the electrode layer 12A is shrunk and the side closer to the electrode layer 12B is swollen conversely in the macromolecular layer 11. For the same reasons as described above, cations in the ionic liquid move toward the electrode layer 12B side. In this case, a voltage V having a higher potential on the electrode layer 12B side than that on the electrode layer 12A side is generated in the polymer element 1. Accordingly, a positive voltage (+V) is detected by the voltage function unit 9 (voltmeter) connected to the electrode layers 12A and 12B.

(C. Operation in Case of Functioning as Electric Double Layer Capacitor)

The polymer element 1 of the embodiment also functions as an electric double layer capacitor. When a predetermined voltage is applied to the electrode layers 12A and 12B, an ionic substance with which the macromolecular layer 11 is impregnated moves and is arranged on the surfaces of the electrode layers 12A and 12B. As a result, an electric double layer is formed, and stores charge, and thus functions as an electric double layer capacitor.

(D. Function of Ion Exchange Membrane Included in Electrode Layers 12A and 12B)

Herein, the function of the ion exchange membrane in the electrode layers 12A and 12B of the polymer element 1 of the embodiment will be described.

Figure 3:
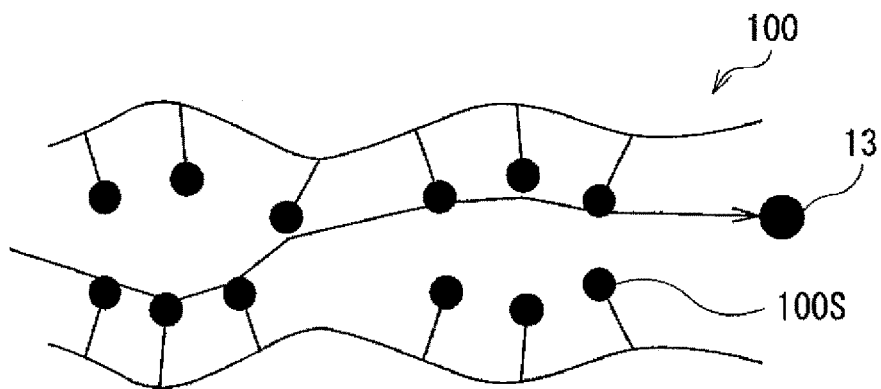
FIG. 3 is a schematic view illustrating a state of cations that move in a cation exchange resin material.

FIG. 3 schematically shows a structure of a cation exchange resin material 100. For example, the cation exchange resin material 100 has an acidic functional group that releases protons such as a sulfone group 100S in the molecule. The conductivity of cations 13 in the cation exchange resin material 100 depends on the density of the sulfone group 100S in the cation exchange resin material 100. As the density of the sulfone group 100S in the ion exchange resin material 100 is higher, that is, as the ion exchange capacity of the cation exchange resin material 100 is larger, the conductivity of the cations 13 is improved more.

However, when the density of the sulfone group 100S in the cation exchange resin material 100 (cation exchange capacity) is increased, the strength of a membrane to be formed from the cation exchange resin material 100 decreases. Therefore, the reliability of a polymer element produced using the cation exchange resin material 100 decreases.

On the other hand, in the electrode layers 12A and 12B of the polymer element 1, the macromolecular material having an acidic functional group is mixed in the cation exchange resin material 100. Therefore, the acidic functional group derived from the macromolecular material exists in addition to the sulfone group 100S in the cation exchange material 100 itself.

Figure 4:
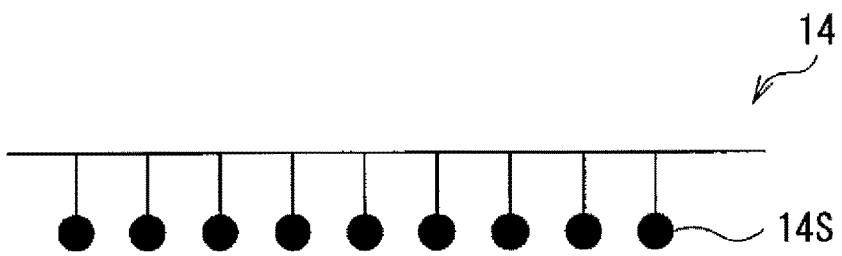
FIG. 4 is a schematic view illustrating a configuration of a macromolecular material.
Figure 5:
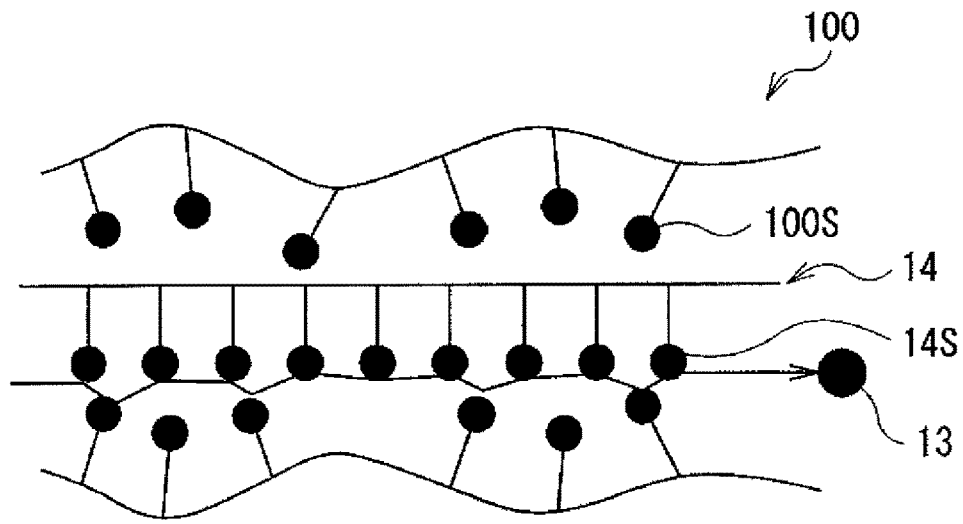
FIG. 5 is a schematic view illustrating a state of cations that move in a mixed material of the cation exchange resin material shown in FIG. 3 and the macromolecular material shown in FIG. 4.

FIG. 4 schematically shows a structure of a macromolecular material having a sulfone group (sulfone group 14S) (macromolecular material 14). FIG. 5 schematically shows a state where the macromolecular material 14 is mixed in the cation exchange resin material 100. In the mixture, molecules of the macromolecular material 14 enter between molecules of the cation exchange resin material 100. The number of the acidic functional group (sulfone group) per unit volume in this case is larger than that of the cation exchange resin material 100 alone. Therefore, the number of the sulfone group (sulfone groups 14S and 100S) that exist in the electrode layers 12A and 12B can be increased without an increase in density of the sulfone group 100S in the cation exchange resin material 100 itself. Accordingly, the strength of the electrode layers 12A and 12B can be maintained and the density of the sulfone group in the electrode layers 12A and 12B can be increased. In the electrode layers 12A and 12B in which a distance between the sulfone groups is short, cations (cations 13) are easily controlled, and the conductivity of the cations is improved.

In the embodiment as described above, the electrode layers 12A and 12B have the acidic functional group (the sulfone group 14S in FIG. 4) derived from the macromolecular material (the macromolecular material 14 in FIG. 4). Therefore, the ionic conductivity of the electrode layers 12A and 12B can be improved without a decrease in strength of the electrode layers 12A and 12B. Accordingly, the reliability of the polymer element 1 can be maintained, and the characteristics thereof can be improved at the same time.

Hereinafter, other embodiments will be described. The same components as those in the embodiment described above are denoted by the same reference numerals and a description thereof will be appropriately omitted.

<Modification 1>

Figure 6:
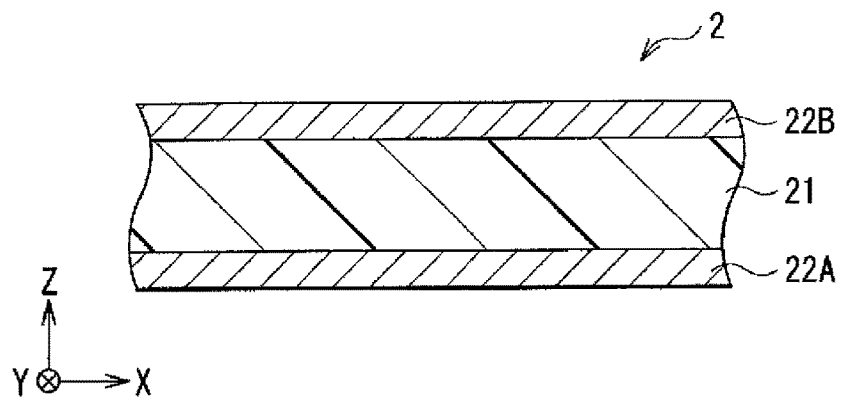
FIG. 6 is a cross-sectional view illustrating a configuration of a polymer element according to Modification 1.

FIG. 6 schematically shows a cross-sectional configuration of a polymer element (polymer element 2) according to Modification 1. In the polymer element 2, a macromolecular layer (macromolecular layer 21) between electrode layers (electrode layers 22A and 22B) is constituted by a cation exchange membrane containing a cation exchange resin material and a macromolecular material having an acidic functional group. Except for this, the polymer element 2 has the same configuration as that of the polymer element 1 of the above-described embodiment as well as the same functions and effects.

As described above, the macromolecular layer 21 is constituted by a cation exchange membrane in which a macromolecular material having an acidic functional group is mixed in a cation exchange resin material. In the cation exchange resin material and the macromolecular material, the same materials as those described for the electrode layers 12A and 12B in the polymer element 1 can be used. When the macromolecular layer 21 contains a macromolecular material having an acidic functional group, the number of the acidic functional group in the macromolecular layer 21 can be increased without an increase in density of the acidic functional group in the cation exchange resin material. Accordingly, the ion conductivity of the macromolecular layer 21 can be improved without a decrease in strength of the macromolecular layer 21. The macromolecular layer 21 may be formed by kneading the cation exchange resin material and the macromolecular material and drawing the mixture.

The electrode layers 22A and 22B contain at least a conductive material. Similarly to the electrode layers 12A and 12B, a conductive material powder is preferably used for the electrode layers 22A and 22B. For example, the electrode layers 22A and 22B are constituted by binding the conductive material powder through an ion conductive macromolecule. For the conductive material powder, for example, the cation exchange resin material in the macromolecular layer 21 can be used.

As described above, in the polymer element 2, the macromolecular layer 21 is constituted by a cation exchange membrane in which the macromolecular material having an acidic functional group is mixed. Thus, the reliability of the polymer element 2 can be maintained and the characteristics thereof can be improved.

Modification 2

Figure 7:
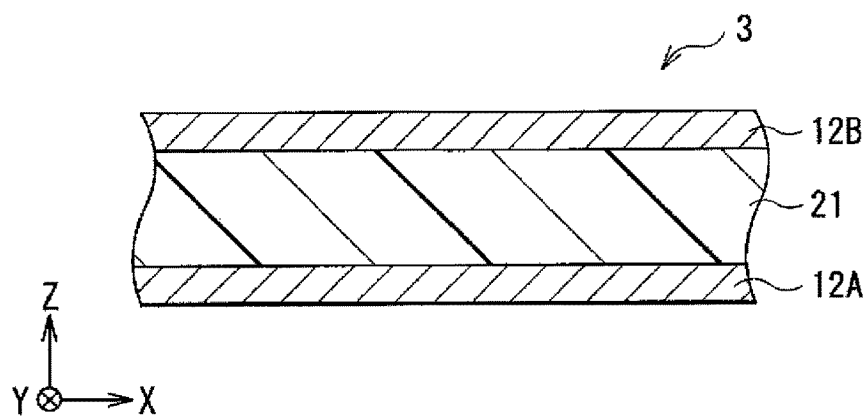
FIG. 7 is a cross-sectional view illustrating a configuration of a polymer element according to Modification 2.

FIG. 7 schematically shows a cross-sectional configuration of a polymer element (polymer element 3) according to Modification 2. In the polymer element 3, electrode layers 12A and 12B and a macromolecular layer 21 are each constituted by a cation exchange membrane containing a cation exchange resin material and a macromolecular material having an acidic functional group. Except for this, the polymer element 3 has the same configuration as that of the polymer element 1 of the embodiment as well as the same functions and effects.

As described above, the electrode layers 12A and 12B and the macromolecular layer 21 contain the cation exchange resin material and the macromolecular material having an acidic functional group. Therefore, the ion conductivity of the polymer element 3 is improved as compared with the polymer elements 1 and 2. Accordingly, the reliability of the polymer element 3 can be maintained and the characteristics thereof can be further improved.

EXAMPLES

Hereinafter, specific Examples in the embodiment will be described.

COMPARATIVE EXAMPLE

First, Nafion (available from DuPont) was impregnated with an ionic liquid to prepare a macromolecular layer. On the other hand, in order to form an electrode layer, carbon powder as a conductive material and Nation as a cation exchange resin material were dispersed in a dispersion medium to prepare a coating. Subsequently, the coating was applied to both faces of the macromolecular layer to form a pair of electrode layers. Thus, a polymer element (Comparative Example) was prepared. Herein, EW of Nation used herein was about 1,100 g/eq, and IEC thereof was about 0.9 meq/g.

Example 1

To a coating for formation of an electrode layer, PSS as a macromolecular material having an acidic functional group was added. PSS was added so that the weight ratio of PSS relative to Nafion and PSS was 9%. Except for this, the same operation as in Comparative Example was performed to prepare a polymer element (Example 1). EW of PSS used herein was about 184 g/eq, and IEC thereof was about 5.43 meq/g.

Example 2

To a coating for formation of an electrode layer, PSS as a macromolecular material having an acidic functional group was added. PSS was added so that the weight ratio of PSS relative to Nafion and PSS was 18%. Except for this, the same operation as in Example 1 was performed to prepare a polymer element (Example 2).

Table 1 shows measurement results of the displacement amounts, the generative forces, and the amounts of decreased displacement in a drying state of the polymer elements according to Examples 1 and 2 and Comparative Example. In Table 1, the results of the polymer elements of Examples 1 and 2 are represented relative to the displacement amount, the generative force, and the amount of decreased displacement in a drying state of the polymer element in Comparative Example as 100%. The amount of decreased displacement in a drying state is an amount of decreased displacement at a humidity of 30% as compared with that at a humidity of 50%.

TABLE 1

| | ADDITION AMOUNT OF PSS (%) | DISPLACEMENT AMOUNT (%) | GENERATIVE FORCE (%) | AMOUNT OF DECREASED DISPLACEMENT IN DRYING STATE (%) |
|---|---|---|---|---|
| COMPARATIVE EXAMPLE | 0 | 100 | 100 | 100 |
| EXAMPLE 1 | 9 | 120 | 114 | 15 |
| EXAMPLE 2 | 18 | 114 | 182 | 38 |

In all Examples 1 and 2 in which PSS was added, the displacement amount and the generative force are larger than those in Comparative Example, and a decrease in displacement in a drying state is suppressed. The polymer element of Comparative Example and the polymer elements of Examples 1 and 2 impart the same reliability.

As confirmed from the results, when the macromolecular material having an acidic functional group is added to the constituent materials of the electrode layer, the operation characteristics thereof can be improved while the reliability of the polymer element cannot be reduced.

APPLICATION EXAMPLES

Next, Application Examples of the polymer elements according to the embodiment and Modifications (application example to an imaging device: Application Examples 1 and 2) will be described.

Application Example 1

(Configuration of Mobile Phone 8)

Figure 8:
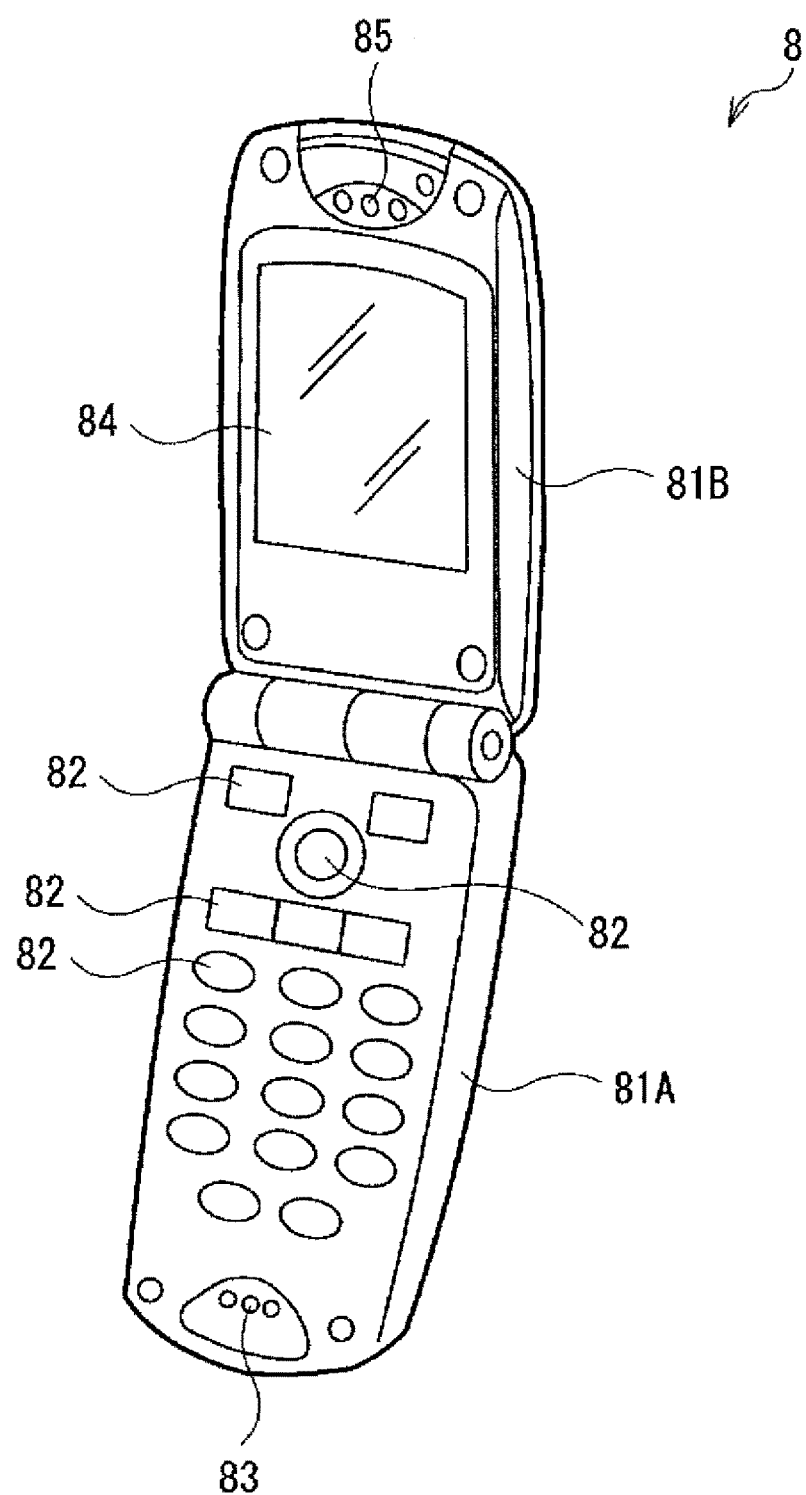
Figure 9:
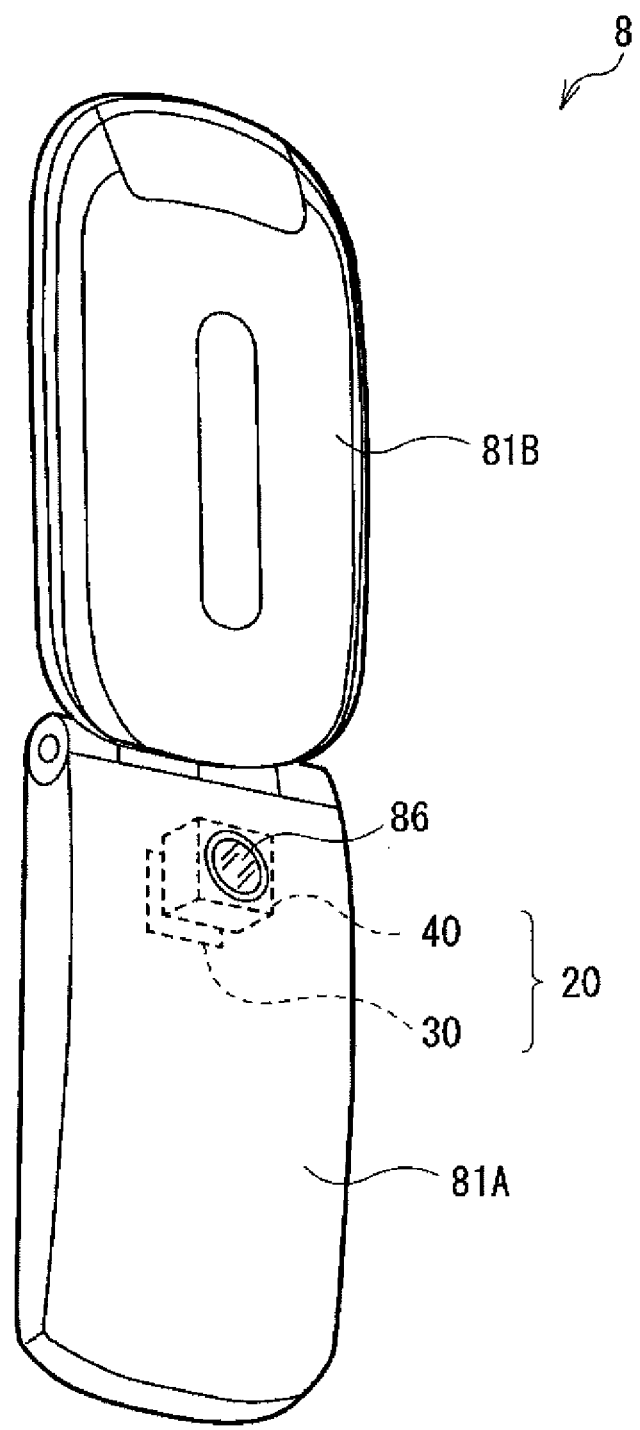
FIG. 9 is a perspective view illustrating the electronic apparatus of FIG. 8 from a different direction.

FIGS. 8 and 9 show perspective views of schematic configuration of a mobile phone (a mobile phone 8) with an imaging function as an example of an electronic apparatus including an imaging device according to Application Example 1 of the polymer elements of the embodiment and the like. In the mobile phone 8, two housings 81A and 81B are foldably connected to each other through a hinge mechanism not shown in the drawings.

As shown in FIG. 8, a plurality of various operation keys 82 are disposed on a surface on one side of the housing 81A and a microphone 83 is disposed on the bottom end of the housing 81A. The operation keys 82 are used to receive predetermined operation by a user so as to input information. The microphone 83 is used to input voice of the user during phone call and the like.

As shown in FIG. 8, a display unit 84 using a liquid crystal display panel, and the like, is disposed on a surface on one side of the housing 81B and a speaker 85 is disposed on the top end of the housing 81B. The display unit 84 can display, for example, various information such as a reception state of radio wave, a battery level, a phone number of a calling party, a content stored in a phonebook (phone numbers, names, and the like of parties concerned), dialed calls, and received calls. The speaker 85 is used to output voice and the like of the calling party during phone call and the like.

As shown in FIG. 9, a cover glass 86 is disposed on a surface on the other side of the housing 81A and an imaging device 20 is disposed in the housing 81A at a position corresponding to that of the cover glass 86. The imaging device 20 is constituted by a camera module 40 disposed on a side of an object (on the cover glass 86 side) and an imaging element 30 disposed on a side of an image (on the internal side of the housing 81A). The imaging element 30 is an element that acquires an imaging signal resulting from imaging by a lens (lens 41 described below) in the camera module 40. The imaging element 30 includes an image sensor provided with, for example, a charge coupled device (CCD) or a complementary metal oxide semiconductor (CMOS).

(Configuration of Imaging Device 20)

Figure 10:
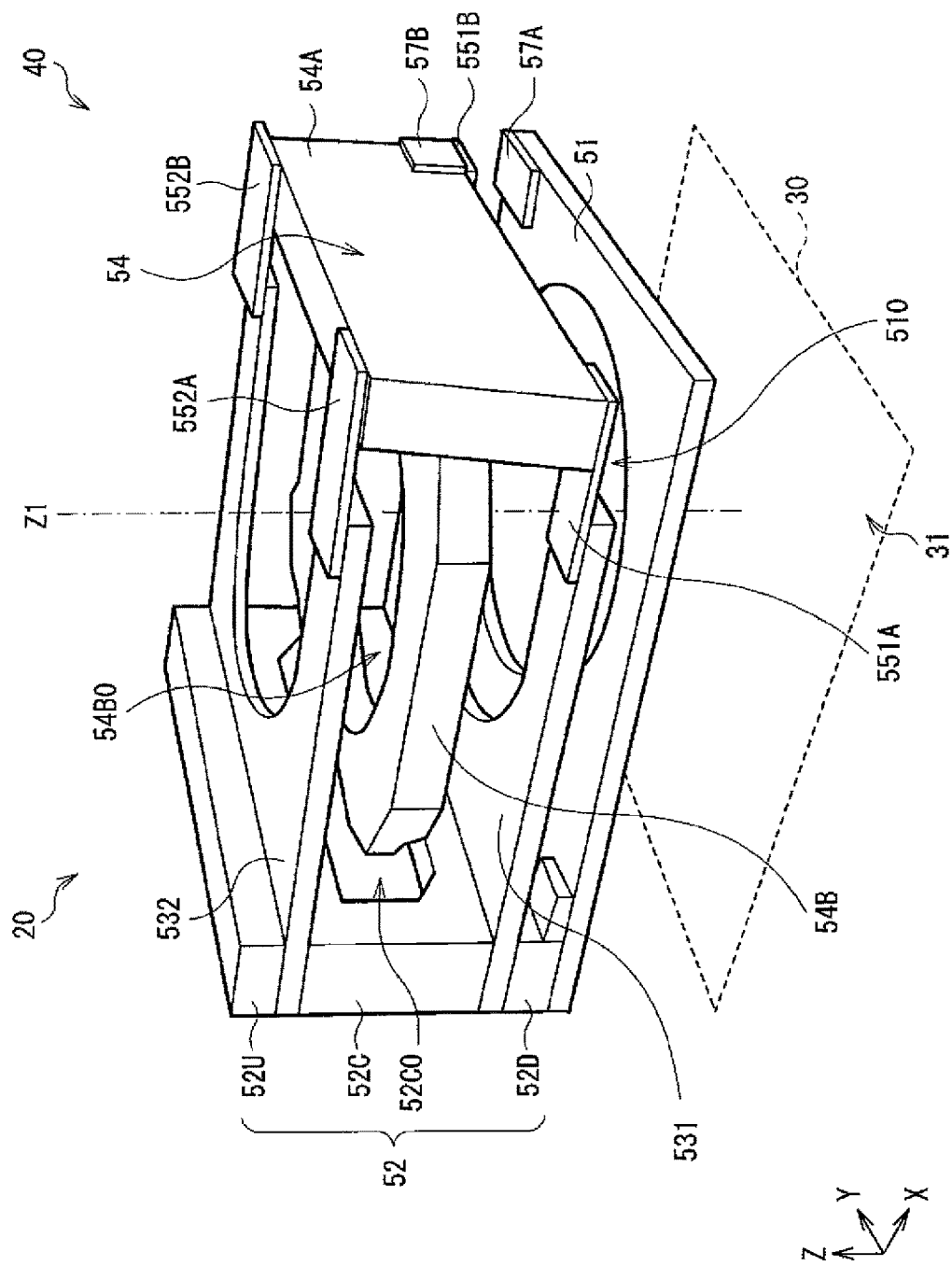
FIG. 10 is a perspective view illustrating a configuration of a main part of an imaging device shown in FIG. 9.
Figure 11:
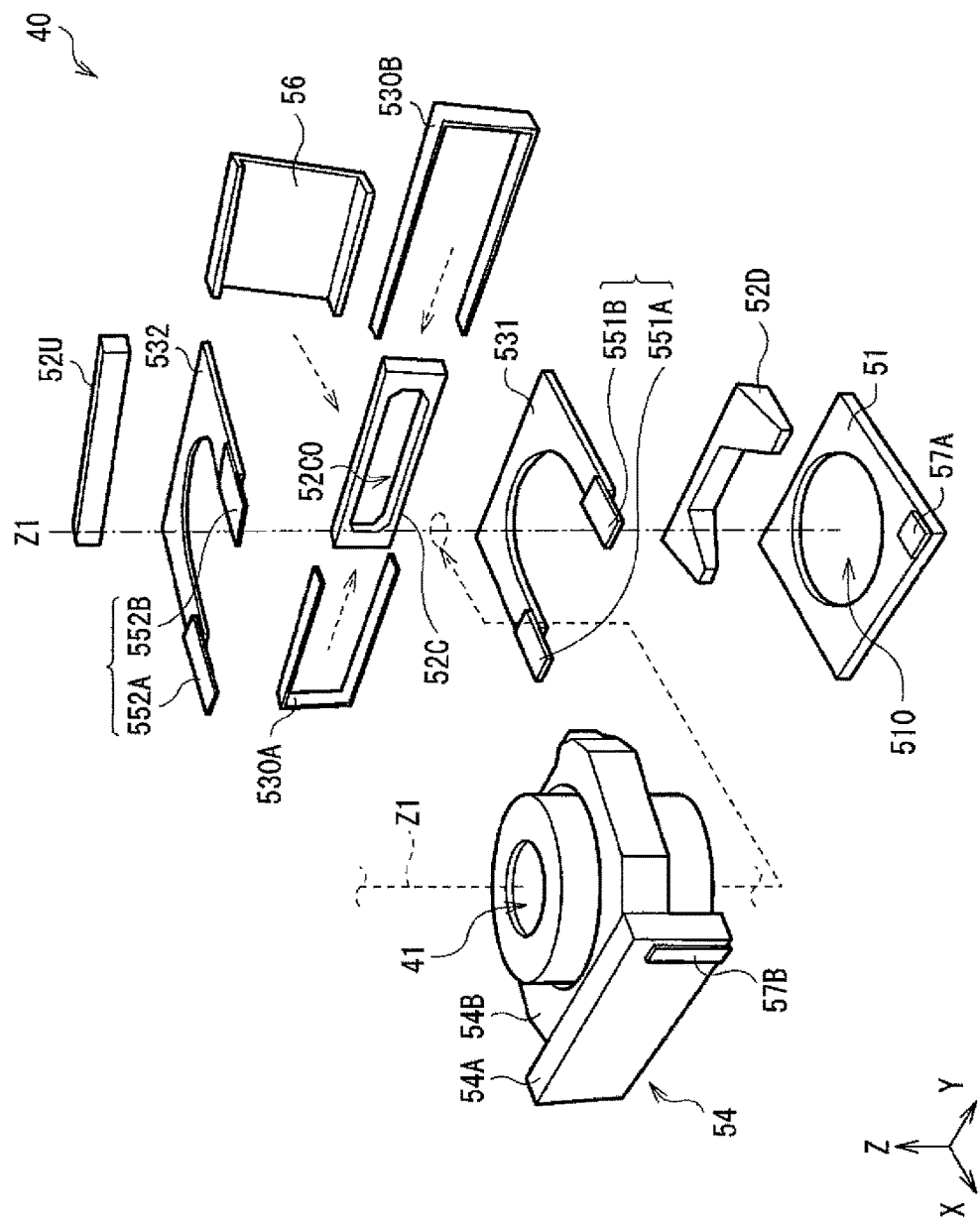
FIG. 11 is an exploded perspective view illustrating a camera module shown in FIG. 9.

FIG. 10 shows a perspective view of a schematic configuration example of the imaging device 20. FIG. 11 shows an exploded perspective view of a configuration of the camera module 40 in the imaging device 20.

The camera module 40 includes a support member 51, a polymer actuator element 531, a lens holding member 54, the lens 41, and a polymer actuator element 532 in order from the image side (on an imaging face 31 side of the imaging element 30) to the object side along an optical axis Z1 (in the positive direction on the Z axis). Further, the polymer actuator elements 531 and 532 are constituted by the aforementioned polymer element 1, 2, or 3. In FIG. 10, illustration of the lens 41 is omitted. Further, the camera module 40 includes a fixing member 52, coupling members 551A, 551B, 552A, and 552B, fixed electrodes 530A and 530B, a presser member 56, and hall elements 57A and 57B. The members of the camera module 40 except for the lens 41 correspond to a specific example of a "drive device for driving a lens" (a lens drive device) in the present technology.

The support member 51 is a base member (a base) for supporting the whole camera module 40.

The fixing member 52 is a member for fixing each end of the polymer actuator elements 531 and 532. The fixing member 52 includes three members including a lower fixing member 52D, a central (middle) fixing member 52C, and an upper fixing member 52U that are arranged from the image side (the lower side of FIGS. 10 and 11) to the object side (the upper side). One end of the polymer actuator element 531 and one end of each of the fixed electrodes 530A and 530B are each disposed between the lower fixing member 52D and the central fixing member 52C. On the other hand, one end of the polymer actuator element 532 and the other end of each of the fixed electrodes 530A and 530B are each disposed between the central fixing member 52C and the upper fixing member 52U. Further, the central fixing member 52C has an opening 52C0 for partially passing a part of the lens holding member 54 (a part of a holding unit 54B described below). This allows the part of the lens holding member 54 to move in the opening 52C0. For this reason, a space can be effectively used, and the camera module 40 can be miniaturized.

The fixed electrodes 530A and 530B are electrodes for supplying a drive voltage Vd (FIG. 12A and FIG. 12B described below) from a voltage supply unit 59 described below to electrode layers (the electrode layers 12A and 12B, and 22A and 22B, described above) in the polymer actuator elements 531 and 532. Each of the fixed electrodes 530A and 530B is formed from gold (Au), metal plated with gold, or the like, and has a U-like shape. Thus, the fixed electrodes 530A and 530B are each disposed so as to sandwich the top and the bottom (both side surfaces along the Z axis) of the central fixing member 52C, and the same voltage can be applied in parallel to the pair of polymer actuator elements 531 and 532 through a small number of wirings. Further, when the fixed electrodes 530A and 530B are constituted by a metal material plated with gold, degradation of contact resistance by oxidation of the surface or the like can be prevented.

The lens holding member 54 is a member for holding the lens 41, and is formed from a hard resin material such as a liquid crystal polymer. The lens holding member 54 includes a circular holding unit 54B that is disposed so that the center thereof is located on the optical axis Z1 and holds the lens 41, and a connecting unit 54A that supports the holding unit 54B and connects the holding unit 54B with the coupling members 551A, 551B, 552A, and 552B. Further, the holding unit 54B is disposed between drive surfaces of the pair of polymer actuator elements 531 and 532.

The polymer actuator elements 531 and 532 each have the drive surface (the drive surface on the X-Y plane) orthogonal to the optical axis Z1 of the lens 41, and are disposed so that the drive surfaces are opposed to each other along the optical axis Z1. The polymer actuator elements 531 and 532 are used to drive the lens holding member 54 (and the lens 41) along the optical axis Z1 through the coupling members 551A, 551B, 552A, and 552B.

The coupling members 551A, 551B, 552A, and 552B are each a member for coupling (connecting) the other end of each of the polymer actuator elements 531 and 532 to one end of the connecting unit 54A. Specifically, the coupling members 551A and 551B each couple the lower end of the connecting unit 54A to the other end of the polymer actuator element 531, and the coupling members 552A and 552B each couple the upper end of the connecting unit 54A to the other end of the polymer actuator element 532. For example, the coupling members 551A, 551B, 552A, and 552B are each formed from a flexible film such as a polyimide film, and preferably formed of a flexible material that has rigidity (flexural rigidity) almost equal to or less than (preferably, equal to or less than) that of the polymer actuator elements 531 and 532. Therefore, the degree of freedom in which the coupling members 551A, 551B, 552A, and 552B are curved in a direction opposite to the curvature direction of the polymer actuator elements 531 and 532 is generated. Accordingly, the cross-sectional shape in a cantilever formed of the polymer actuator elements 531 and 532 and the coupling members 551A, 551B, 552A, and 552B curves in an S-like shape. As a result, the connecting unit 54A is allowed to move in parallel in the Z-axis direction, and the holding unit 54B (and the lens 40) is driven in the Z-axis direction while a parallel state with respect to the support member 51 is maintained. For example, a spring constant may be used as the rigidity (flexural rigidity) described above.

(Operation of Camera Module 4)

Figure 12A:
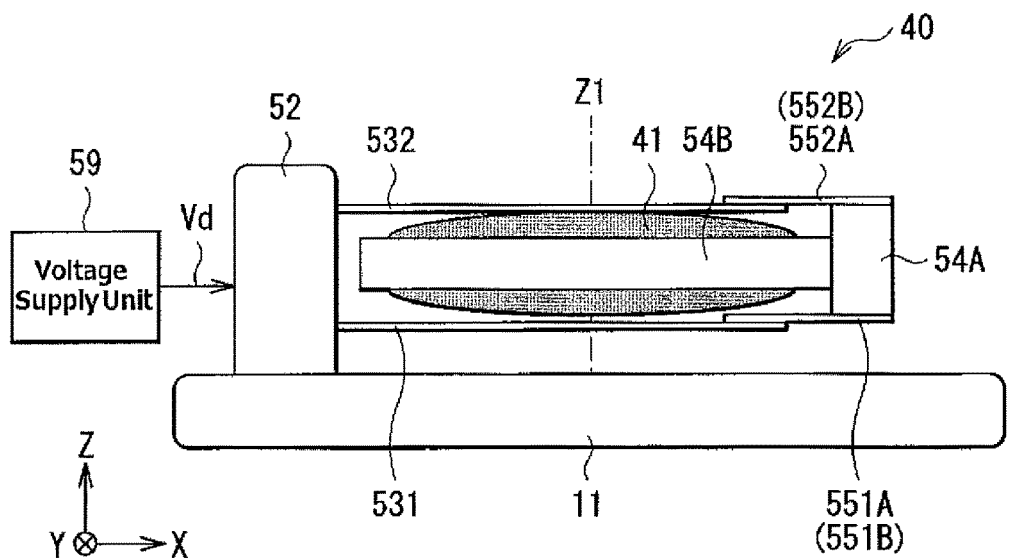
FIG. 12A is a schematic side view illustrating a state of the camera module of FIG. 11 before operation.
Figure 12B:
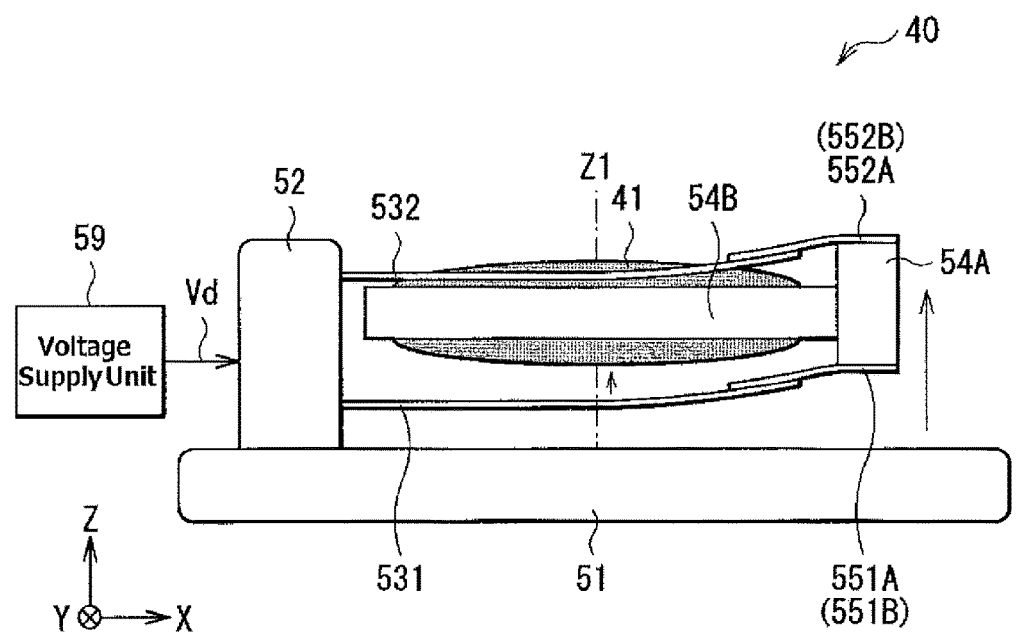
FIG. 12B is a schematic cross-sectional side view illustrating a state of the camera module of FIG. 12A after operation.

FIGS. 12A and 12B each schematically show a side view (Z-X side view) of a configuration example of the camera module 40. FIG. 12A shows a state before operation, and FIG. 12B shows a state after the operation.

In the camera module 40, when a drive voltage Vd is supplied from the voltage supply unit 59 to the polymer actuator elements 531 and 532, the other end side of each of the polymer actuator devices 531 and 532 is curved along the Z-axis direction on the basis of the aforementioned principle. Thus, the lens holding member 54 is driven by the polymer actuator elements 531 and 532, and the lens 41 is allowed to move along the optical axis Z1 thereof (see the arrow in FIG. 12B). In the camera module 40, the lens 41 is thus driven along the optical axis Z1 by a drive device (a lens drive device) using the polymer actuator elements 531 and 532. Therefore, the lens 41 in the camera module 40 is moved along the optical axis Z1 thereof, to perform focusing and zooming.

Application Example 2

Next, an imaging device (camera module) according to Application Example 2 of the polymer elements of the embodiment and the like will be described. The imaging device according to this Application Example is also built in the mobile phone 8 with an imaging function as shown in FIGS. 8 and 9, for example. While the polymer element (polymer actuator element) is used as a lens drive device in the imaging device 20 of Application Example 1, the polymer element (polymer actuator element) is used as a drive device for driving an imaging element 30 in the imaging device of this Application Example as described below.

(Configuration of Imaging Device 20A)

Figure 13:
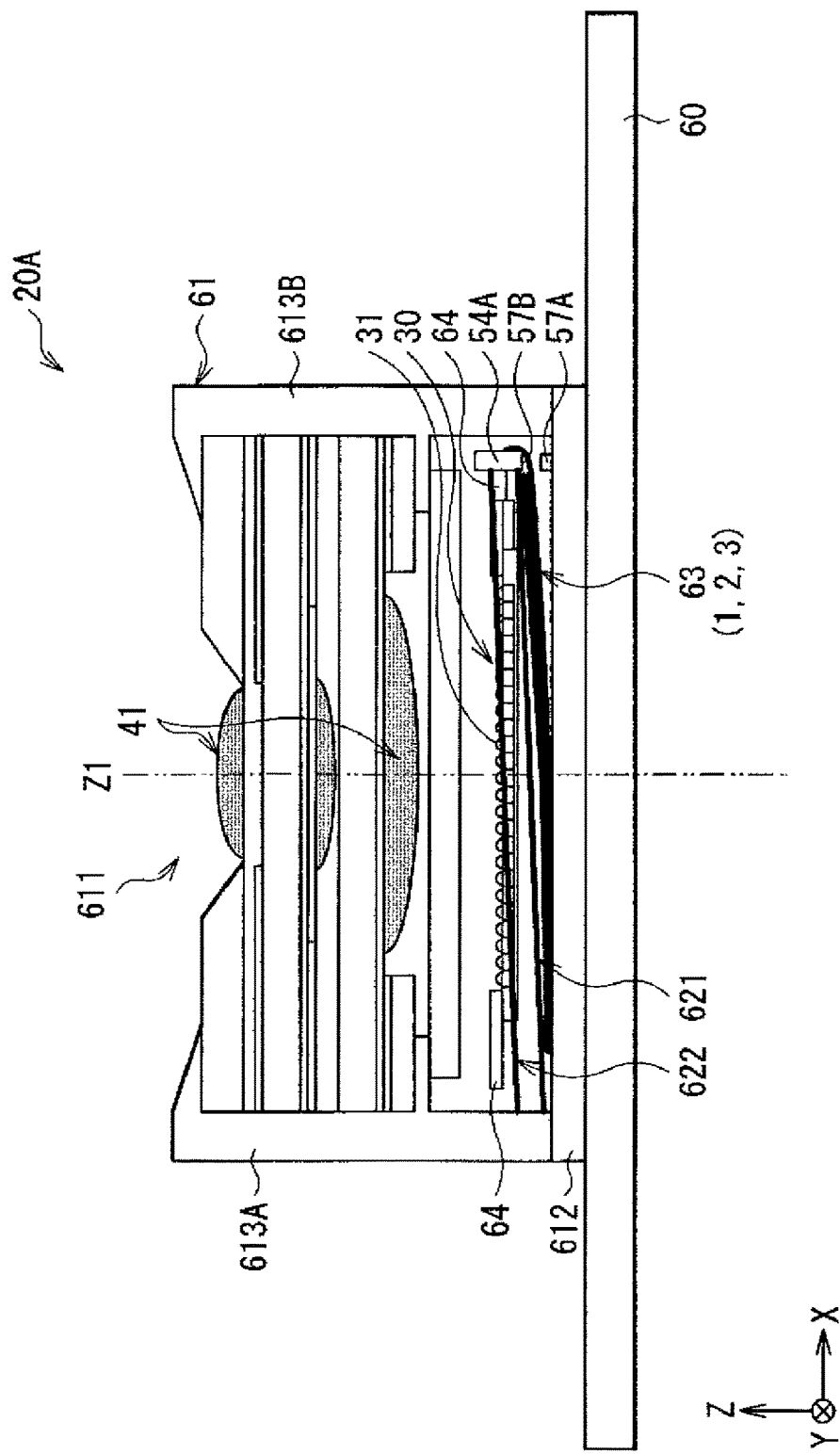
FIG. 13 is a cross-sectional view illustrating another example of the imaging device of FIG. 10.

FIG. 13 shows a side view (a Z-X side view) of a schematic configuration example of the imaging device (imaging device 20A) according to this Application Example. The imaging device 20A includes a housing 61 for holding various members on a substrate 60.

The housing 61 has an opening 611 for disposing the lens 41, a pair of side wall members 613A and 613B, and a bottom member member 612 located on the substrate 60. One end side of each of a pair of plate springs 621, 622 is fixed to the side wall member 613A. The imaging element 30 is disposed on the other end side of each of the plate springs 621, 622 through a connecting member 54A and a support member 64. One end side of a polymer actuator element 63 is fixed onto the bottom member 612. The other end side of the polymer actuator element 63 is fixed onto the bottom face of the support member 64. A hall element 57A is also disposed on the bottom member 612, and a hall element 57B is disposed on a position opposite to the hall element 57A on the connecting member 54A.

Among the members of the imaging device 20A, the bottom member 612, the side wall member 613A, the plate springs 621 and 622, the polymer actuator element 63, the support member 64, and the connecting member 54A mainly correspond to a specific example of the "drive device for driving an imaging element" (imaging element drive device) in the present technology.

As described above, the polymer actuator element 63 is an element for driving the imaging element 30, and is constituted by the polymer element 1, 2, or 3 according to the embodiment or the like.

(Operation of Imaging Device 20A)

Figure 14A:
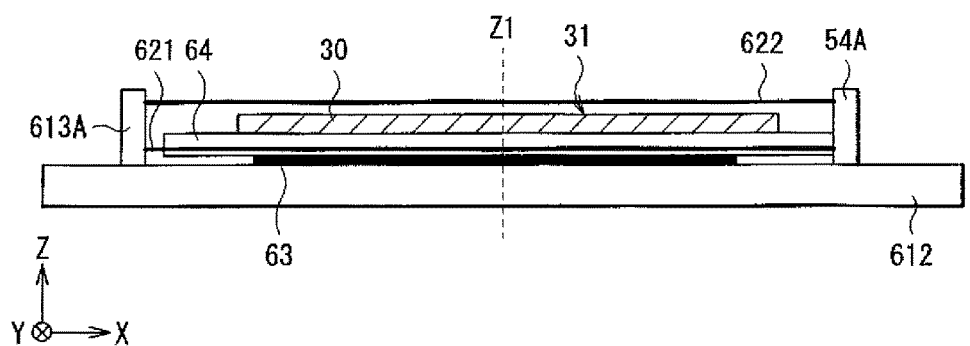
FIG. 14A is a schematic side view illustrating a state of the imaging device of FIG. 13 before operation.
Figure 14B:
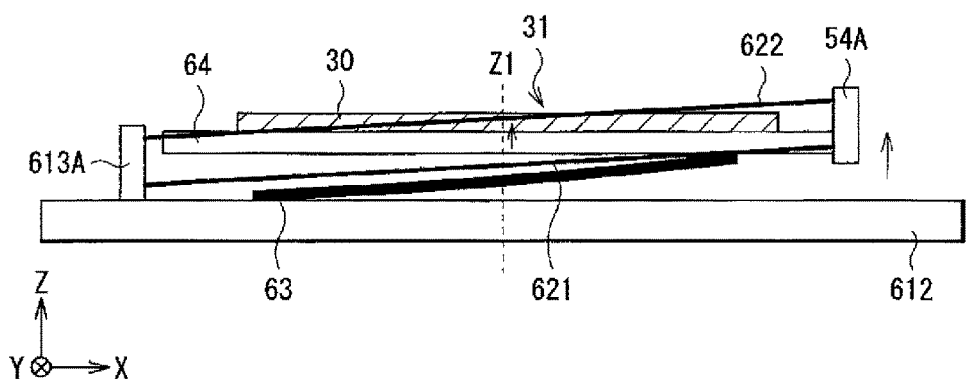
FIG. 14B is a schematic cross-sectional view illustrating a state of the imaging device of FIG. 14A after the operation.

FIGS. 14A and 14B each schematically show a side view (Z-X side view) of a part of the imaging device 20A (the imaging element drive device as described above). FIG. 14A shows a state before operation, and FIG. 14B shows a state after the operation.

In the imaging device 20A, when a driving voltage Vd is supplied from a voltage supply unit (not shown) to the polymer actuator element 63, the other end side of the polymer actuator element 63 is curved in the Z-axis direction on the basis of the foregoing principle. Thus, the connecting member 54A is driven by the polymer actuator element 63, and the imaging element 30 is allowed to move along the optical axis Z1 of the lens 41 (see the arrow in FIG. 14B). As described above, in the imaging device 20A, the imaging element 30 is driven along the optical axis Z1 of the lens 41 by the drive device (imaging element drive device) using the polymer actuator element 63. Accordingly, a relative distance between the lens 41 and the imaging element 30 is changed to perform focusing and zooming.

Other Application Examples

Figure 15A:
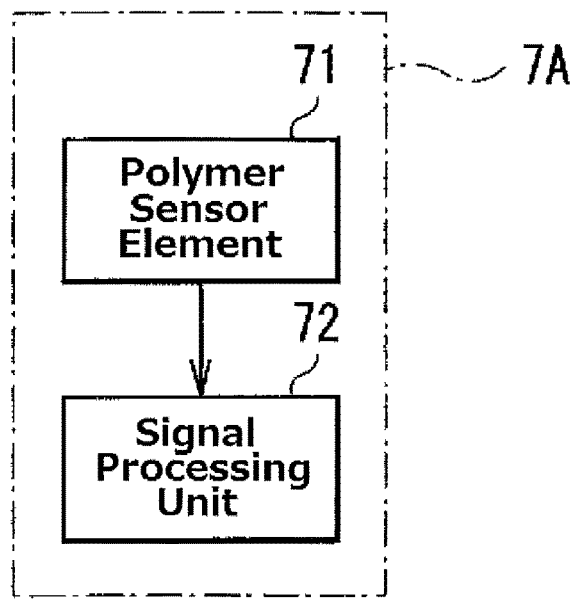
Figure 15B:
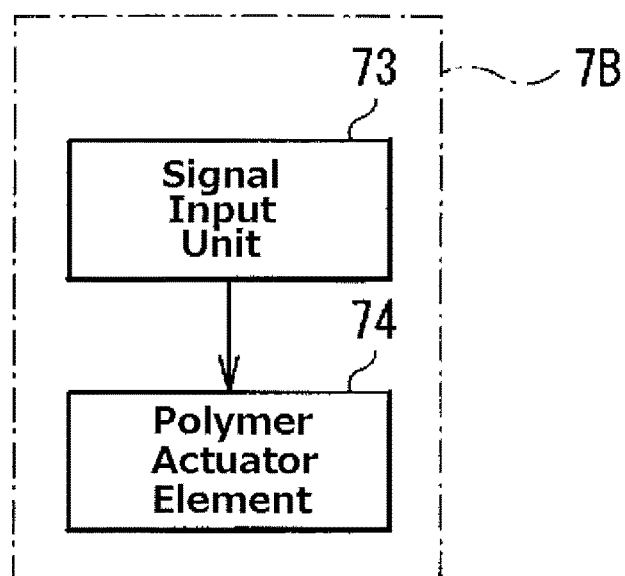
FIG. 15B is a schematic view illustrating another example of the electronic apparatus shown in FIG. 14A.

FIGS. 15A and 15B schematically show a configuration example of an electronic apparatus (electronic apparatuses 7A and 7B) according to other Application Examples.

The electronic apparatus 7A (FIG. 15A) includes a polymer sensor element 71 and a signal processing unit 72. In the electronic apparatus 7A, a signal that is detected by deformation of the polymer sensor element 71 is input into the signal processing unit 72, and various types of signal processings are performed. Examples of the electronic apparatus 7A may include a pulse sensor for detecting vasodilation and vasoconstriction, a tactile sensor for detecting a touch position of fingers and the like and the strength of touch, a bending sensor for detecting a bending state accompanying page turning of book and the like, and a motion sensor for detecting the motion of joint of a human and the like.

The electronic apparatus 7B (FIG. 15B) includes a signal input unit 73 and a polymer actuator element 74. In the electronic apparatus 7B, the polymer actuator element 74 is deformed by a signal from the signal input unit 73. Examples of the electronic apparatus 7B may include a catheter.

<Other Modifications>

The technology of the present technology has been described with reference to the embodiment, Modifications, and Application Examples. However, the present technology is not limited to the embodiment and the like, and may be variously modified. For example, shapes, materials, and the like of the polymer element and the other members in the imaging device are not limited to those described in the above-described embodiment and the like, and the layered structure of the polymer element is also not limited to that described in the above-described embodiment and the like. They may be appropriately modified.

Further, in the above-described embodiment and the like, a case where cations move in the polymer element has been described as one example. However, a case where anions move in the polymer element may be adopted. In this case, the electrode layers 12A and 12B and the macromolecular layer 21 of the polymer element 2 are each constituted by an anion exchange membrane containing an anion exchange resin material and a macromolecular material having a basic functional group.

In addition, in these Application Examples described above, a case where the polymer actuator element or the polymer sensor element is applied to an electronic apparatus has been described as one example. However, a polymer element functioning as an electric double layer capacitor may be applied to an electronic apparatus. The cation exchange membrane containing the macromolecular material having an acidic functional group described in the above-described embodiment and the like or an anion exchange membrane containing a macromolecular material having a basic functional group may be used as a separator of a battery such as a rechargeable battery.

Further, in the above-described embodiment and the like, the lens drive device that drives a lens as a driving target along the optical axis thereof has mainly been described as an example of the drive device of the present technology. However, the present technology is not limited to the case, and for example, the lens drive device may drive a lens in a direction orthogonal to the optical axis thereof. Further, the drive device of the present technology can be applied to a drive device that drives other driving targets such as a diaphragm (see Japanese Patent Application Laid-Open No. 2008-259381, etc.) and image stabilization other than the lens drive device and the imaging element drive device. The drive unit, the camera module, and the imaging device of the present technology can be applied to various electronic apparatuses other than the mobile phone described in the above-described embodiment.

The effects described herein are merely examples, are not necessarily limited, and may be other effects.

In the present technology, the following configurations can be applied.

(1) An ion exchange membrane including a cation exchange resin material and a macromolecular material that has an acidic functional group and is mixed in the cation exchange resin material.

(2) The ion exchange membrane described in the aforesaid (1), wherein the acidic functional group is a sulfone group.

(3) The ion exchange membrane described in the aforesaid (1) or (2), wherein a contained amount of the macromolecular material in terms of a weight ratio in the cation exchange resin material and the macromolecular material is 5% or more and 25% or less.

(4) The ion exchange membrane described in any one of the aforesaid (1) to (3), wherein an ion exchange capacity of the macromolecular material having an acidic functional group is larger than that of the cation exchange resin material.

(5) The ion exchange membrane described in any one of the aforesaid (1) to (4), wherein the macromolecular material has a molecular weight of 10,000 or more.

(6) An ion exchange membrane including an anion exchange resin material and a macromolecular material that has a basic functional group and is mixed in the anion exchange resin material.

(7) A polymer element including a pair of electrode layers and a macromolecular layer disposed between the pair of electrode layers, wherein at least one of the pair of electrode layers and the macromolecular layer includes a cation exchange resin material and a macromolecular material that has an acidic functional group and is mixed in the cation exchange resin material.

(8) The polymer element described in the aforesaid (7), wherein the pair of electrode layers include a conductive material powder, the cation exchange resin material, and the macromolecular material.

(9) The polymer element described in the aforesaid (8), wherein the conductive material powder is carbon powder.
(10) The polymer element described in any one of the aforesaid (7) to (9), wherein the pair of electrode layers and the macromolecular layer each include the cation exchange resin material and the macromolecular material.
(11) The polymer element described in any one of the aforesaid (7) to (10) configured as a polymer actuator element.
(12) The polymer element described in any one of the aforesaid (7) to (10), configured as a polymer sensor element.
(13) The polymer element described in any one of the aforesaid (7) to (12), wherein the macromolecular layer is impregnated with an ionic substance.
(14) An electronic apparatus including a polymer element having a pair of electrode layers and a macromolecular layer disposed between the pair of electrode layers, wherein at least one of the pair of electrode layers and the macromolecular layer includes a cation exchange resin material and a macromolecular material that has an acidic functional group and is mixed in the cation exchange resin material.
(15) A camera module including a lens and a drive device that is configured to include a polymer element and drives the lens, wherein the polymer element includes a pair of electrode layers and a macromolecular layer disposed between the pair of electrode layers, and at least one of the pair of electrode layers and the macromolecular layer includes a cation exchange resin material and a macromolecular material that has an acidic functional group and is mixed in the cation exchange resin material.
(16) An imaging device including a lens, an imaging element for acquiring an imaging signal resulting from imaging by the lens, and a drive device that is configured to include a polymer element and drives the lens or the imaging device, wherein the polymer element includes a pair of electrode layers and a macromolecular layer disposed between the pair of electrode layers, and at least one of the pair of electrode layers and the macromolecular layer includes a cation exchange resin material and a macromolecular material that has an acidic functional group and is mixed in the cation exchange resin material.

This application claims the priority based on Japanese Patent Application No. 2013-249011, filed on Dec. 2, 2013, the content of which is incorporated herein by reference in its entirety.

It should be understood by those skilled in the art that various modifications, combinations, sub-combinations, and alterations may be made depending on design requirements and other factors, but fall within the scope of the appended claims and their equivalents.

The invention claimed is:
1. An ion exchange membrane comprising:
a cation exchange resin material; and
a macromolecular material that has an acidic functional group and is mixed in the cation exchange resin material, wherein
a contained amount of the macromolecular material in terms of a weight ratio in the cation exchange resin material and the macromolecular material is 5% or more and 25% or less,
the macromolecular material having the acidic functional group has an ion exchange capacity as an IEC value of 2 meq/g or more and the cation exchange resin material has an ion exchange capacity as an IEC value of 0.9 to 1.5 meq/g, and
the macromolecular material has a molecular weight of 10,000 or more and is selected from the group consisting of:
a polystyrene sulfonate represented by Chemical Formula 2:

(Chemical Formula 2)

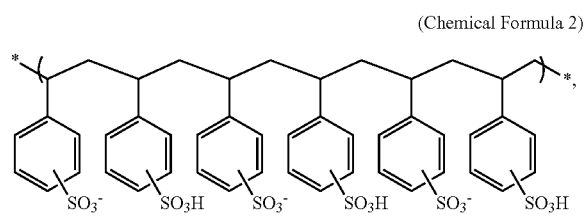

a polyvinylsulfonic acid represented by Chemical Formula 3:

(Chemical Formula 3)

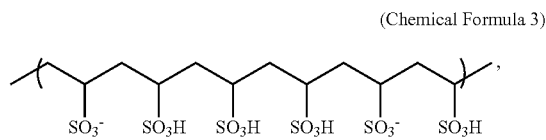

a polyethersulfonic acid represented by Chemical Formula 4 in which n is an integer of 1 to 6:

(Chemical Formula 4)

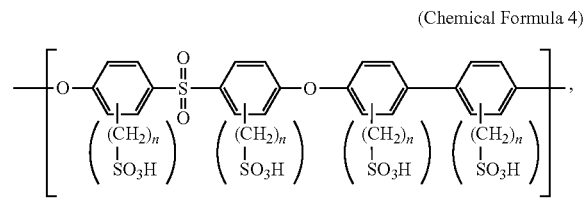

and
a polyethersulfonic acid represented by Chemical Formula 5 in which n' is an integer of 1 to 6:

(Chemical Formula 5)

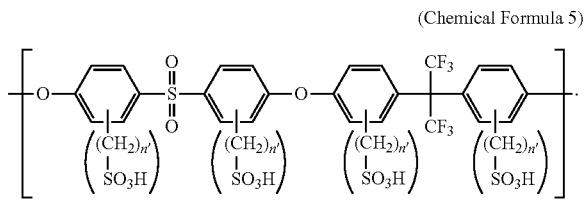

2. The ion exchange membrane according to claim 1, wherein an ion exchange capacity of the macromolecular material having an acidic functional group is larger than that of the cation exchange resin material.

3. A polymer element comprising:
a pair of electrode layers; and
a macromolecular layer disposed between the pair of electrode layers, wherein at least one of the pair of electrode layers and the macromolecular layer includes
a cation exchange resin material, and
a macromolecular material that has an acidic functional group and is mixed in the cation exchange resin material,
a contained amount of the macromolecular material in terms of a weight ratio in the cation exchange resin material and the macromolecular material is 5% or more and 25% or less,
the macromolecular material having the acidic functional group has an ion exchange capacity as an IEC value of 2 meq/g or more and the cation exchange resin material has an ion exchange capacity as an IEC value of 0.9 to 1.5 meq/g, and
the macromolecular material has a molecular weight of 10,000 or more and is selected from the group consisting of:
a polystyrene sulfonate represented by Chemical Formula 2:

(Chemical Formula 2)

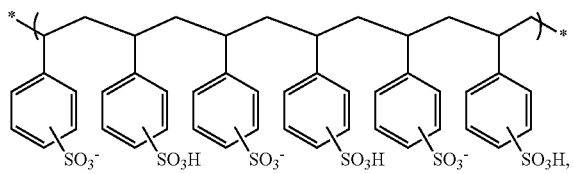

a polyvinylsulfonic acid represented by Chemical Formula 3:

(Chemical Formula 3)

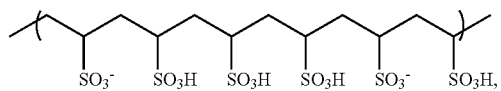

a polyethersulfonic acid represented by Chemical Formula 4 in which n is an integer of 1 to 6:

4. The polymer element according to claim 3, wherein the pair of electrode layers include a conductive material powder, the cation exchange resin material, and the macromolecular material.
5. The polymer element according to claim 4, wherein the conductive material powder is carbon powder.
6. The polymer element according to claim 3, wherein the pair of electrode layers and the macromolecular layer each include the cation exchange resin material and the macromolecular material.
7. The polymer element according to claim 3, configured as a polymer actuator element.
8. The polymer element according to claim 3, configured as a polymer sensor element.
9. The polymer element according to claim 3, wherein the macromolecular layer is impregnated with an ionic substance.
10. An electronic apparatus comprising
a polymer element having a pair of electrode layers and a macromolecular layer disposed between the pair of electrode layers, wherein
at least one of the pair of electrode layers and the macromolecular layer includes
a cation exchange resin material, and
a macromolecular material that has an acidic functional group and is mixed in the cation exchange resin material,
a contained amount of the macromolecular material in terms of a weight ratio in the cation exchange resin material and the macromolecular material is 5% or more and 25% or less,
the macromolecular material having the acidic functional group has an ion exchange capacity as an IEC value of 2 meq/g or more and the cation exchange resin material has an ion exchange capacity as an IEC value of 0.9 to 1.5 meq/g, and
the macromolecular material has a molecular weight of 10,000 or more and is selected from the group consisting of:
a polystyrene sulfonate represented by Chemical Formula 2:

(Chemical Formula 4)

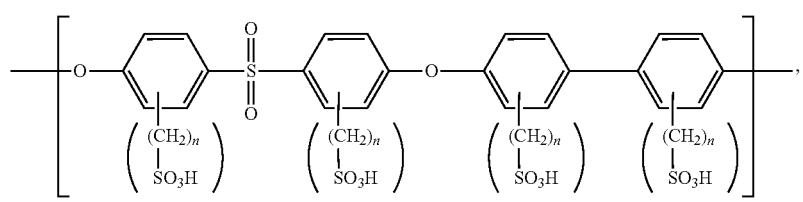

and
a polyethersulfonic acid represented by Chemical Formula 5 in which n' is an integer of 1 to 6:

(Chemical Formula 5)

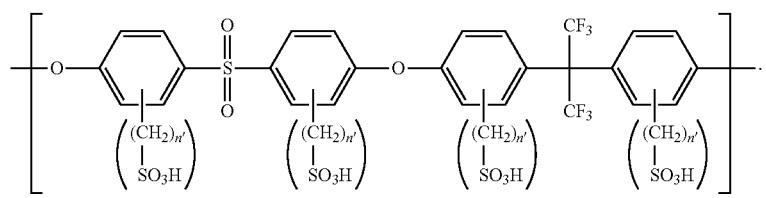

a contained amount of the macromolecular material in terms of a weight ratio in the cation exchange resin material and the macromolecular material is 5% or more and 25% or less, the macromolecular material having the acidic functional group has an ion exchange capacity as an IEC value of 2 meq/g or more and the cation exchange resin material has an ion exchange capacity as an IEC value of 0.9 to 1.5 meq/g, and the macromolecular material has a molecular weight of 10,000 or more and is selected from the group consisting of:

a polystyrene sulfonate represented by Chemical Formula 2:

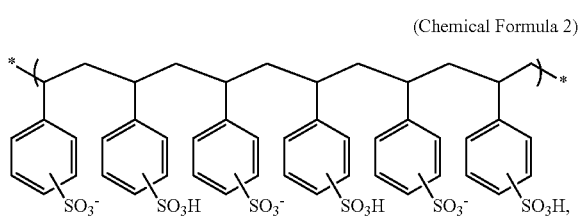

(Chemical Formula 2)

a polyvinylsulfonic acid represented by Chemical Formula 3:

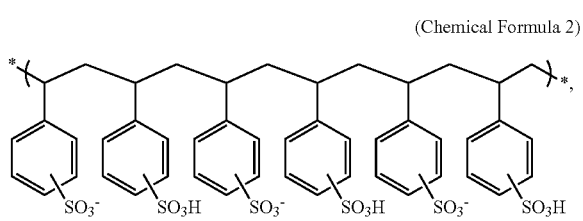

(Chemical Formula 3)

a polyethersulfonic acid represented by Chemical Formula 4 in which n is an integer of 1 to 6:

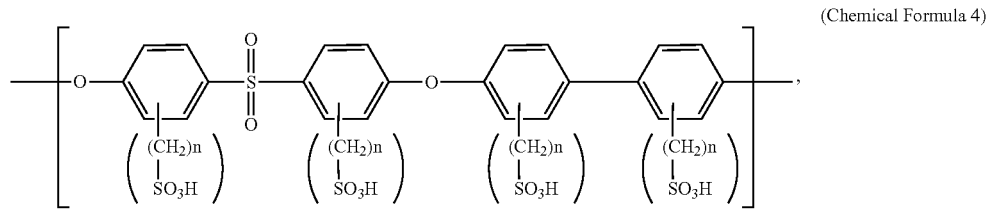

(Chemical Formula 4)

and a polyethersulfonic acid represented by Chemical Formula 5 in which n' is an integer of 1 to 6:

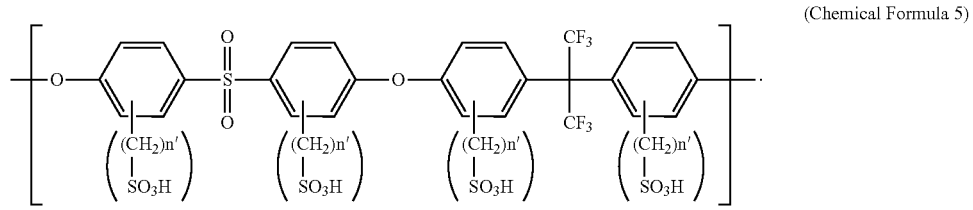

(Chemical Formula 5)

11. A camera module comprising:

a lens; and a drive device that is configured to include a polymer element and drives the lens, wherein the polymer element includes a pair of electrode layers and a macromolecular layer disposed between the pair of electrode layers, at least one of the pair of electrode layers and the macromolecular layer includes a cation exchange resin material, and a macromolecular material that has an acidic functional group and is mixed in the cation exchange resin material, a polyvinylsulfonic acid represented by Chemical Formula 3:

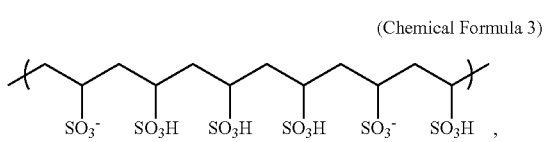

(Chemical Formula 3)

a polyethersulfonic acid represented by Chemical Formula 4 in which n is an integer of 1 to 6:

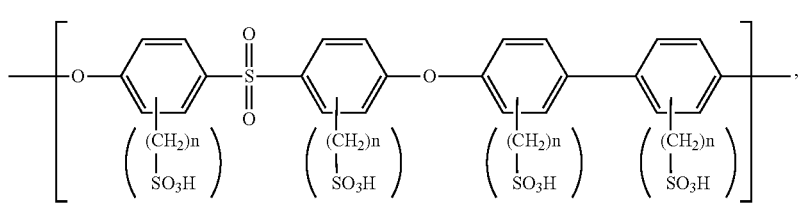
(Chemical Formula 4)

and
a polyethersulfonic acid represented by Chemical Formula 5 in which n' is an integer of 1 to 6:

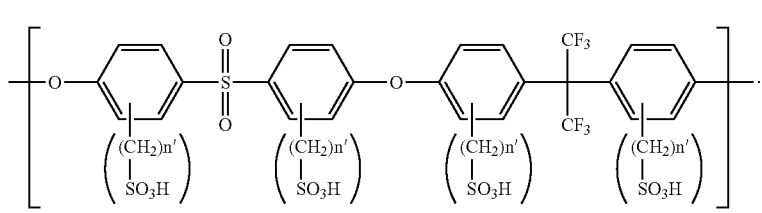
(Chemical Formula 5)

12. An imaging device comprising:
a lens;
an imaging element for acquiring an imaging signal resulting from imaging by the lens; and
a drive device that is configured to include a polymer element and drives the lens or the imaging device, wherein
the polymer element includes
a pair of electrode layers and
a macromolecular layer disposed between the pair of electrode layers, at least one of the pair of electrode layers and the macromolecular layer includes
a cation exchange resin material and
a macromolecular material that has an acidic functional group and is mixed in the cation exchange resin material,
a contained amount of the macromolecular material in terms of a weight ratio in the cation exchange resin material and the macromolecular material is 5% or more and 25% or less,
the macromolecular material having the acidic functional group has an ion exchange capacity as an IEC value of 2 meq/g or more and the cation exchange resin material has an ion exchange capacity as an IEC value of 0.9 to 1.5 meq/g, and
the macromolecular material has a molecular weight of 10,000 or more and is selected from the group consisting of:

a polystyrene sulfonate represented by Chemical Formula 2:

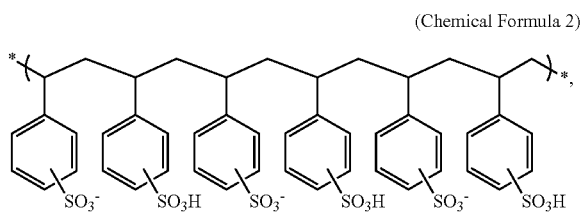
(Chemical Formula 2)

a polyvinylsulfonic acid represented by Chemical Formula 3:

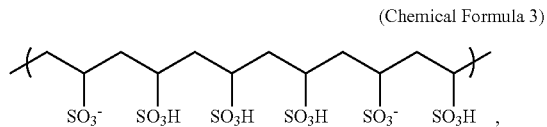
(Chemical Formula 3)

a polyethersulfonic acid represented by Chemical Formula 4 in which n is an integer of 1 to 6:

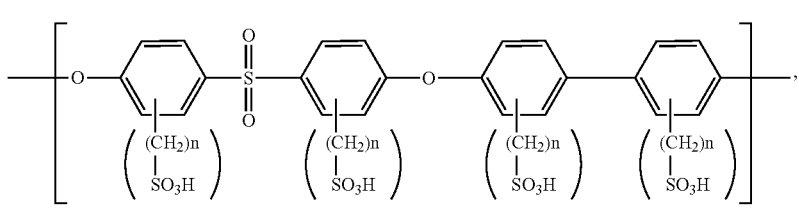
(Chemical Formula 4)

and
a polyethersulfonic acid represented by Chemical Formula 5 in which n' is an integer of 1 to 6:

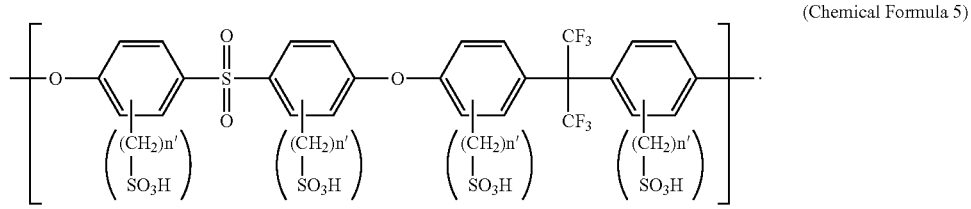

(Chemical Formula 5)

13. The ion exchange membrane according to claim 1, wherein the macromolecular material is the polystyrene sulfonate represented by Chemical Formula 2:

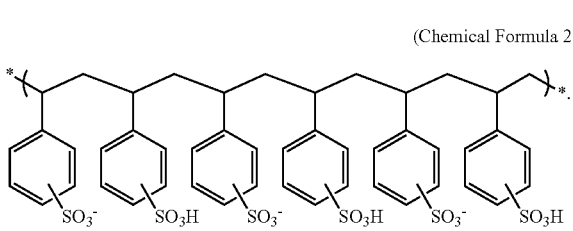

(Chemical Formula 2)

14. The ion exchange membrane according to claim 1, wherein the macromolecular material is the polyvinylsulfonic acid represented by Chemical Formula 3:

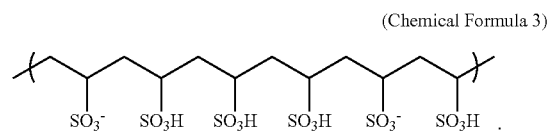

(Chemical Formula 3)

15. The ion exchange membrane according to claim 1, wherein the macromolecular material is the polyethersulfonic acid represented by Chemical Formula 4 or 5:

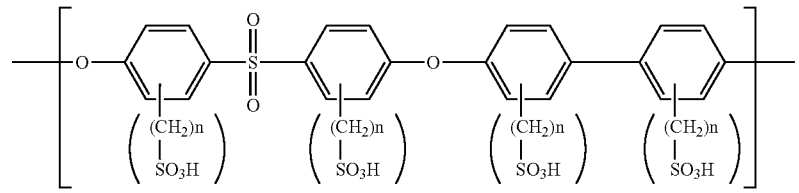

(Chemical Formula 4, in which n is an integer of 1 to 6),

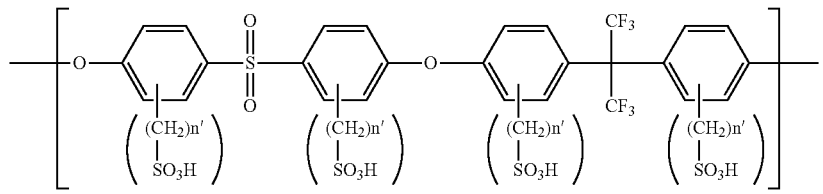

(Chemical Formula 5, in which n' is an integer of 1 to 6).

\* \* \* \* \*